(12) United States Patent
Takahashi et al.

(10) Patent No.: US 10,082,720 B2
(45) Date of Patent: Sep. 25, 2018

(54) WAVELENGTH CONVERSION ELEMENT AND WAVELENGTH CONVERSION LIGHT PULSE WAVEFORM SHAPING DEVICE

(71) Applicant: HAMAMATSU PHOTONICS K.K., Hamamatsu-shi, Shizuoka (JP)

(72) Inventors: Hisanari Takahashi, Hamamatsu (JP); Yoichi Kawada, Hamamatsu (JP); Takashi Inoue, Hamamatsu (JP); Koyo Watanabe, Hamamatsu (JP); Koji Takahashi, Hamamatsu (JP); Hironori Takahashi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/696,432

(22) Filed: Sep. 6, 2017

(65) Prior Publication Data

US 2018/0067376 A1 Mar. 8, 2018

(30) Foreign Application Priority Data

Sep. 8, 2016 (JP) .................................. 2016-175682

(51) Int. Cl.
*G02F 1/35* (2006.01)
*G02F 1/355* (2006.01)

(52) U.S. Cl.
CPC ............. *G02F 1/353* (2013.01); *G02F 1/3551* (2013.01); *G02F 2201/34* (2013.01); *G02F 2202/20* (2013.01); *G02F 2203/13* (2013.01)

(58) Field of Classification Search
CPC . G02F 1/35; G02F 1/3551; G02F 1/13; G02F 1/353; G02F 2201/34; G02F 2202/20; G02F 2203/13; H01S 3/0092
See application file for complete search history.

(56) References Cited

U.S. PATENT DOCUMENTS

| 2008/0107141 A1* | 5/2008 | Ma ......................... G02F 1/3775 372/21 |
| 2009/0257462 A1* | 10/2009 | Furukawa ............. H01S 5/4062 372/22 |

(Continued)

OTHER PUBLICATIONS

J. R. Danielson et al., "Generation of arbitrary terahertz wave formsin fanned-out periodically poled lithium niobate", Applied Physics Letters, vol. 89, 2006, p. 211118-1-211118-3.

(Continued)

*Primary Examiner* — David E Smith
(74) *Attorney, Agent, or Firm* — Drinker Biddle & Reath LLP

(57) ABSTRACT

A wavelength conversion element includes a crystal having a periodically poled structure in which polarization is inverted with an inversion period $\Lambda$ along a z-axis which is an input axis of a light pulse. The wavelength conversion element is configured to generate an output the inversion period $\Lambda(x)$ at each position x by change of the inversion period $\Lambda$ according to the position x, and when a target frequency linearly changing with the position x is set to $f_T(x)=b+ax$, a frequency width of the output frequency is set to $\delta f(x)$, and the output frequency is set to $f(x)=f_T(x)+\alpha(x)$, the output frequency is set to coincide with the target frequency within a range satisfying a condition $|\alpha(x)| \leq \delta f(x)$.

14 Claims, 14 Drawing Sheets

(56) References Cited

U.S. PATENT DOCUMENTS

2011/0043895 A1* 2/2011 Hikmet ............... G02F 1/3775
359/328
2011/0317727 A1* 12/2011 Furuya ............... H01S 3/0627
372/27

OTHER PUBLICATIONS

M. Jewariya et al., "Ladder Climbing on the AnharmonicIntermolecular Potential in an Amino Acid Microcrystal via anIntense Monocycle Terahertz Pulse", Physical Review Letters, vol. 105, 2010, p. 203003-1-203003-4.

Y.-S. Lee et al., "Generation of narrow-band terahertz radiation viaoptical rectification of femtosecond pulses in periodically poledlithium niobate", Applied Physics Letters, vol. 76, 2000, p. 2505-2507.

Y.-S. Lee et al., "Terahertz pulse shaping via optical rectification inpoled lithium niobate", Applied Physics Letters, vol. 82, 2003, p. 170-172.

A. Monmayrant et al., "A newcomer's guide to ultrashort pulseshaping and characterization", J. Phys. B: At. Mol. Opt. Phys., vol. 43103001, 2010, p. 1-34.

P. E. Powers et al., "Continuous tuning of a continuous-waveperiodically poled lithium niobate optical parametric oscillator by use of a fan-out grating design", Optics Letters, vol. 23, 1998, p. 159-161.

K. Yamaguchi et al., "Coherent Control of Spin Precession Motionwith Impulsive Magnetic Fields of Half-Cycle Terahertz Radiation", Physical Review Letters, vol. 105, 2010, p. 237201-1-237201-4.

N. E. Yu et al., "Backward Terahertz Generation in PeriodicallyPoled Lithium Niobate Crystal via Difference Frequency Generation", Japanese Journal of Applied Physics, vol. 46, 2007, p. 1501-1504.

N. E. Yu et al., "Continuous tuning of a narrow-band terahertz wavein periodically poled stoichiometric LiTaO3 crystal with a fan-outgrating structure", Applied Physics Express, vol. 7, 2014, p. 012101-1-012101-4.

* cited by examiner

WAVELENGTH CONVERSION ELEMENT AND WAVELENGTH CONVERSION LIGHT PULSE WAVEFORM SHAPING DEVICE

BACKGROUND OF THE INVENTION

Field of the Invention

The present invention relates to a wavelength conversion element for performing wavelength conversion of an input light pulse to an output light pulse and a wavelength conversion light pulse waveform shaping device using the wavelength conversion element.

Related Background Art

Terahertz (THz) waves are generally defined as electromagnetic waves with a frequency of 0.1 THz to 10 THz, and coherent control such as control of spin waves and quantum computation is considered as an application thereof. Energy of the THz wave corresponds to energy of vibration, rotation, spin and the like of a molecule. Therefore, the THz wave is expected as an important tool in the coherent control such as understanding of a molecular structure and molecular dissociation.

Non-Patent Document 1: M. Jewariya et al., "Ladder Climbing on the Anharmonic Intermolecular Potential in an Amino Acid Microcrystal via an Intense Monocycle Terahertz Pulse", Physical Review Letters Vol. 105 pp. 203003-1-203003-4 (2010)

Non-Patent Document 2: K. Yamaguchi et al., "Coherent Control of Spin Precession Motion with Impulsive Magnetic Fields of Half-Cycle Terahertz Radiation", Physical Review Letters Vol. 105 pp. 237201-1-237201-4 (2010)

Non-Patent Document 3: J. R. Danielson et al., "Generation of arbitrary terahertz wave forms in fanned-out periodically poled lithium niobate", Applied Physics Letters Vol. 89 pp. 211118-1-211118-3 (2006)

Non-Patent Document 4: Y.-S. Lee et al., "Generation of narrow-band terahertz radiation via optical rectification of femtosecond pulses in periodically poled lithium niobate", Applied Physics Letters Vol. 76 pp. 2505-2507 (2000)

Non-Patent Document 5: P. E. Powers et al., "Continuous tuning of a continuous-wave periodically poled lithium niobate optical parametric oscillator by use of a fan-out grating design", Optics Letters Vol. 23 pp. 159-161 (1998)

Non-Patent Document 6: Y.-S. Lee et al., "Terahertz pulse shaping via optical rectification in poled lithium niobate", Applied Physics Letters Vol. 82 pp. 170-172 (2003)

Non-Patent Document 7: N. E. Yu et al., "Backward Terahertz Generation in Periodically Poled Lithium Niobate Crystal via Difference Frequency Generation", Japanese Journal of Applied Physics Vol. 46 pp. 1501-1504 (2007)

Non-Patent Document 8: N. E. Yu et al., "Continuous tuning of a narrow-band terahertz wave in periodically poled stoichiometric LiTaO3 crystal with a fan-out grating structure", Applied Physics Express Vol. 7 pp. 012101-1-012101-4 (2014)

Non-Patent Document 9: A. Monmayrant et al., "A newcomer's guide to ultrashort pulse shaping and characterization", J. Phys. B: At. Mol. Opt. Phys. Vol. 43 103001 pp. 1-34 (2010)

SUMMARY OF THE INVENTION

In the application of the THz wave such as the coherent control described above, the waveform shaping of the THz wave is required. For example, in ladder climbing to excite molecular vibrations in steps, a chirp THz wave pulse corresponding to Rabi oscillation is required (Non-Patent Document 1). Further, in Non-Patent Document 2, a half-cycle THz wave is required for controlling a spin wave using a THz wave pulse. However, although the technology of controlling a phase and an amplitude of light by a light pulse waveform shaper (optical pulse shaper) is known in a wavelength region such as visible light, in the wavelength region of the THz wave, the technology of sufficiently controlling the phase and the amplitude of the THz wave is not established.

The present invention has been made in order to solve the above problem, and an object thereof is to provide a wavelength conversion element and a wavelength conversion light pulse waveform shaping device capable of being preferably applied to the waveform shaping of the light pulse such as the THz wave pulse.

In order to achieve the above object, a wavelength conversion element according to the present invention includes (1) a crystal having a periodically poled structure in which polarization is inverted with a predetermined inversion period $\Lambda$ along a second axis, with respect to a first axis and the second axis perpendicular to the first axis serving as an input axis of an input light pulse of a wavelength conversion (frequency conversion) object, and (2) the wavelength conversion element is configured to generate an output light pulse converted to have an output frequency f(x) corresponding to the inversion period $\Lambda(x)$ at each position x by change of the inversion period $\Lambda$ according to the position x along the first axis, and (3) when a target frequency linearly changing with the position x is set to $f_T(x)=b+ax$ (where a and b are constants), a frequency width of the output frequency at the position x is set to $\delta f(x)$, and the output frequency is set to $f(x)=f_T(x)+\alpha(x)$, the output frequency f(x) is set to coincide with the target frequency $f_T(x)$ within a range satisfying a condition $|\alpha(x)| \le \delta f(x)$.

In the wavelength conversion element described above, the crystal having the periodically poled structure along the second axis being the input axis of the input light pulse is used as a wavelength conversion medium, and the polarization inversion period $\Lambda$ in the crystal is configured to change as $\Lambda(x)$ according to the position x along the first axis. With such a configuration, it is possible to obtain the light pulse in which the output frequency f(x) changes according to the position x in the output light pulse after the wavelength conversion.

Furthermore, in such a configuration, regarding the change in the inversion period $\Lambda(x)$ according to the position x along the first axis, the target frequency $f_T(x)$ linearly changing with the position x is set and the actual output frequency f(x) is set so as to coincide with the target frequency in a predetermined range. With such a configuration, it is possible to realize the wavelength conversion element capable of being preferably applied to the waveform shaping of the output light pulse such as the THz wave pulse. Here, the output light pulse obtained by the wavelength conversion is, for example, a light pulse converted to have a longer wavelength than that of the input light pulse.

A wavelength conversion light pulse waveform shaping device according to the present invention includes (1) a light pulse waveform shaper configured to control at least a phase of an initial light pulse supplied from a pulse light source to generate the input light pulse having a predetermined waveform at each position x along the first axis, (2) the wavelength conversion element having the above-described configuration configured to input the input light pulse from the light pulse waveform shaper to generate the output light pulse after wavelength conversion to output, and (3) an output optical system configured to generate a final wavelength conversion light pulse to output by combining light pulse components having the output frequencies f(x) changing according to the position x along the first axis included in the output light pulse from the wavelength conversion element.

In this manner, according to the wavelength conversion light pulse waveform shaping device obtained by combining the light pulse waveform shaper for the initial light pulse with the wavelength conversion element having the above-described configuration, the generation of the output light pulse such as the THz wave pulse after the wavelength conversion and the waveform shaping of the wavelength conversion light pulse may be preferably realized.

According to the wavelength conversion element and the wavelength conversion light pulse waveform shaping device according to the present invention, the crystal having the periodically poled structure along the second axis is used as a wavelength conversion medium, the polarization inversion period Λ in the crystal is configured to change according to the position x along the first axis, and regarding the change in the inversion period Λ(x) according to the position x along the first axis, the target frequency $f_T(x)$ linearly changing with the position x is set and the output frequency f(x) is set so as to coincide with the target frequency $f_T(x)$ within a predetermined range, so that the generation and the waveform shaping of the output light pulse such as the THz wave pulse may be preferably realized.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE EMBODIMENTS

Figure 1:
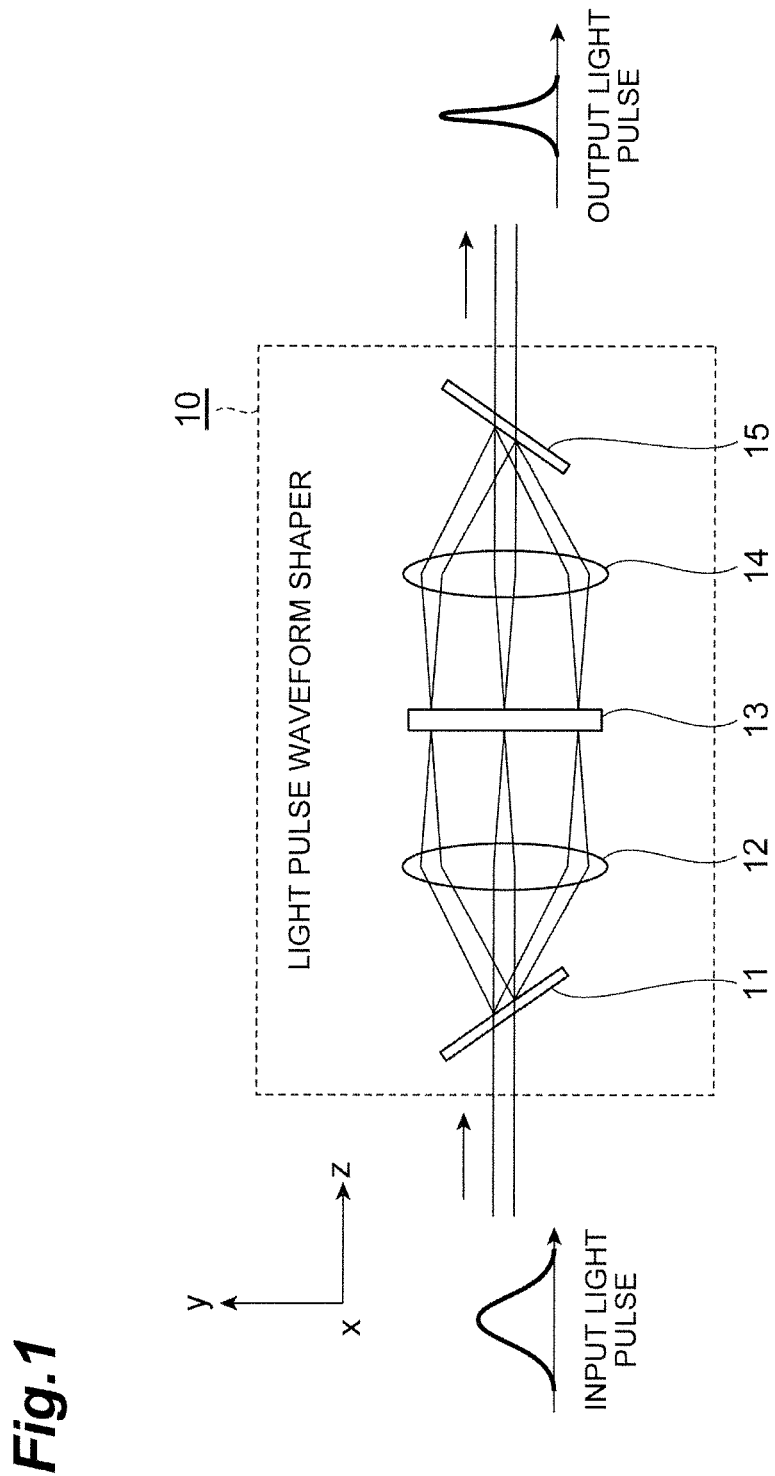
FIG. 1 is a view illustrating an example of a configuration of a light pulse waveform shaper.

Hereinafter, embodiments of a wavelength conversion element and a wavelength conversion light pulse waveform shaping device according to the present invention will be described in detail with reference to the drawings. In the description of the drawings, the same elements will be denoted by the same reference signs, without redundant description. The dimensional ratios in the drawings are not always coincident with those in the description.

First, a configuration of a light pulse waveform shaper (optical pulse shaper) conventionally used in a wavelength region of visible light and the like will be described. FIG. 1 is a view illustrating an example of the configuration of the light pulse waveform shaper and a principle of waveform shaping. A light pulse waveform shaper 10 illustrated in FIG. 1 is an optical system configured to be able to control at least a phase, preferably the phase and an amplitude (intensity) of an input light pulse such as a visible light pulse for each wavelength component (frequency component) of the light pulse.

Here, in the following drawings of the light pulse waveform shaper, the wavelength conversion element, and the wavelength conversion light pulse waveform shaping device, an xyz orthogonal coordinate system is illustrated together for facilitating the description. In the orthogonal coordinate system, a z-axis is an optical axis (second axis) of the light pulse which is an input axis of the input light pulse to the waveform shaper or the wavelength conversion element and an output axis of an output light pulse. An x-axis, being an axis perpendicular to the z-axis, is a spatial axis in a spatial light modulator of the waveform shaper and a frequency axis (first axis) in the wavelength conversion element. A y-axis, being an axis perpendicular to the z-axis and the x-axis, is a wavelength axis in the spatial light modulator of the waveform shaper.

The light pulse waveform shaper 10 of the present configuration example includes a diffraction grating 11, a lens 12, a phase mask 13, a lens 14, and a diffraction grating 15 in this order from an input side of the input light pulse of the waveform shaping object. The input light pulse input to the waveform shaper 10 is dispersed by the diffraction grating 11 by wavelengths in the y-axis direction and passes through the lens 12 to be incident on the phase mask 13. Wavelength components of the light pulse are subjected to different phase shifts by the phase mask 13. Thereafter, the phase modulated wavelength components are combined through the lens 14 and the diffraction grating 15 to be output from the waveform shaper 10 as the output light pulse after waveform shaping.

A fixed-pattern phase mask may be used, for example, as the phase mask 13. In this case, it is possible to control and change a waveform shaping condition of the output light pulse by replacing the phase mask. Further, it is preferable to use a spatial light modulator (SLM) capable of electronically controlling a modulation pattern as the phase mask 13. In this case, it is possible to control and change the waveform shaping condition of the output light pulse by controlling a modulation pattern presented in the spatial light modulator.

Figure 2:
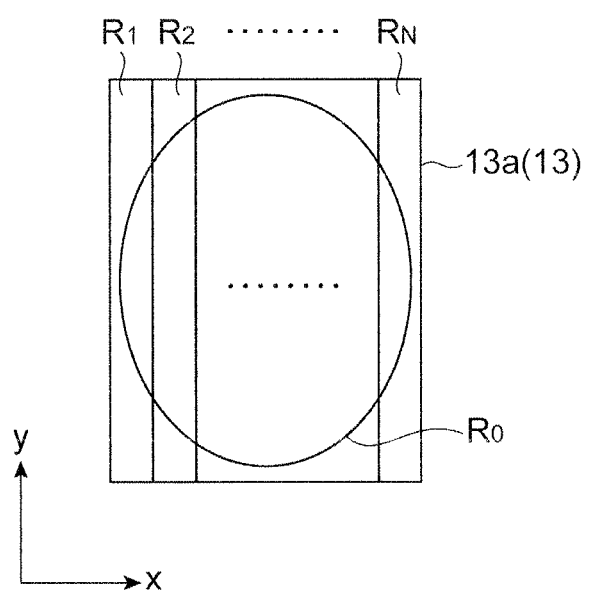
FIG. 2 is a view illustrating modulation of a light pulse in a spatial light modulator.

FIG. 2 is a view illustrating modulation of the light pulse in a case where a spatial light modulator 13a is used as the phase mask 13. Here, a modulator including a plurality of modulation pixels two-dimensionally arrayed on an xy plane perpendicular to the optical axis is assumed as the spatial light modulator 13a. In a modulation plane of the spatial light modulator 13a, the y-axis being a dispersing direction in the diffraction grating 11 is the wavelength axis and the x-axis perpendicular to the wavelength axis is the spatial axis.

In such a configuration, it is possible to control a waveform of the light pulse by applying the modulation in the wavelength axis direction to the light pulse. For example, it is possible to control a time width of the light pulse by applying second-order dispersion in the wavelength axis direction to the light pulse. It is also possible to control the intensity of the light pulse by applying the modulation in the spatial axis direction to the light pulse. For example, when a diffraction grating pattern is presented in the spatial axis direction in the spatial light modulator 13a, a part of the light pulse is reflected in a direction different from a normal direction, and as a result, the intensity of the light pulse may be controlled.

Here, in FIG. 2, the modulation plane of the spatial light modulator 13a is divided into a plurality of regions $R_1$ to $R_N$ in the spatial axis direction. Further, on the modulation plane of the spatial light modulator 13a, a region on which the light pulse of the waveform shaping object is incident is represented as a region $R_0$.

Next, the wavelength conversion element which performs wavelength conversion on the input light pulse to generate the output light pulse such as a THz wave pulse will be described. As described later, the waveform shaping of the light pulse such as the THz wave pulse becomes possible by combining the wavelength conversion element with the light pulse waveform shaper illustrated in FIG. 1. Here, in the following description, the THz wave pulse is mainly assumed as the output light pulse obtained by the wavelength conversion, but the output light pulse is not limited to the THz wave pulse and may be the light pulse which may be generated by the wavelength conversion element, for example, the light pulse with the wavelength converted to be longer than that of the input light pulse.

Spectrum control of the THz wave using a fan-out type periodically poled lithium niobate (PPLN: periodically poled $LiNbO_3$) being a crystal having a periodically poled structure as the wavelength conversion element capable of generating the THz wave pulse is reported (Non-Patent Document 3). In a configuration disclosed in Non-Patent Document 3, as illustrated in FIG. 1(a) in the document, an input light pulse is input to a fan-out PPLN and an output THz wave pulse is generated by wavelength conversion (frequency conversion) by the PPLN.

Further, all the THz wave components generated by the wavelength conversion by the PPLN are combined by an off-axis parabolic mirror (OAP) to be detected as the THz wave pulse by a THz wave detector. At this time, frequency components of the THz wave generated by the PPLN are filtered by inserting a shadow mask immediately before the fan-out PPLN and blocking a specific light pulse component with the mask.

Figure 3:
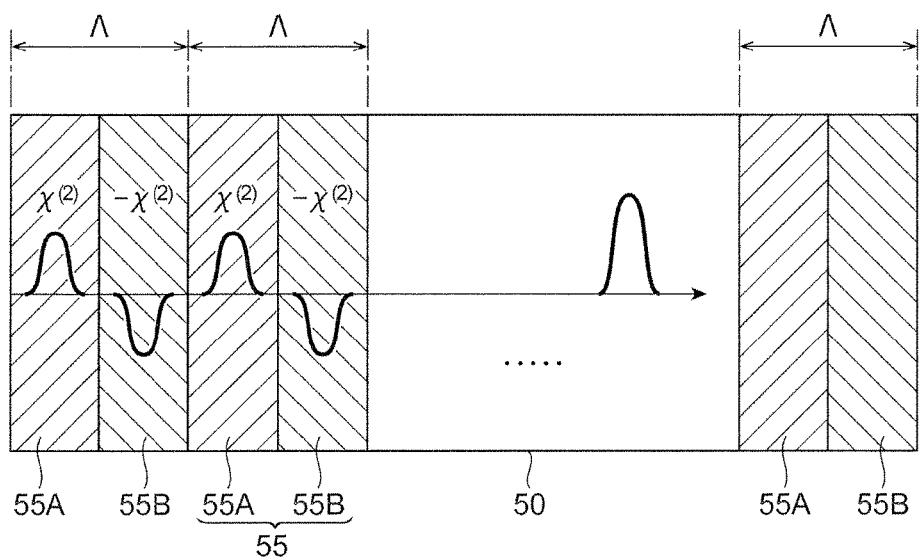
FIG. 3 is a view illustrating wavelength conversion of the light pulse in a wavelength conversion element.

Here, the wavelength conversion of the light pulse by using a periodically poled crystal and the generation of the THz wave will be specifically described with FIG. 3. FIG. 3 is a view schematically illustrating the wavelength conversion of the light pulse in the wavelength conversion element. Here, in FIG. 3, a configuration using a normal periodically poled crystal which is not the fan-out type is illustrated as a wavelength conversion element 50 for facilitating the description. In the crystal of the wavelength conversion element 50 in FIG. 3, an individual polarization region forming the periodically poled structure is represented by a polarization region 55. The polarization region 55 is formed of a pair of a polarization region 55A and a polarization region 55B with opposite polarization directions. Here, a length of the polarization region 55 is defined as an inversion period Λ. Further, the sum of the lengths of the regions 55A and 55B is equal to the inversion period Λ, and the length of each of the regions 55A and 55B is preferably Λ/2.

The periodically poled crystal is a crystal configured to compensate for mismatch in phase velocity between the input light pulse (pump light pulse) and the output light pulse after the wavelength conversion (wavelength conversion light pulse, for example, THz wave pulse) by periodically inverting the polarization in a ferroelectric crystal having a second-order non-linear optical effect. FIG. 3 is a conceptual diagram of THz wave generation by the wavelength conversion element 50 using the periodically poled crystal (refer to Non-Patent Document 4).

When a high-intensity light pulse is incident on the ferroelectric crystal, a difference frequency of a plurality of frequency components included in the light pulse is generated. This phenomenon is known as optical rectification. This difference frequency corresponds to the THz wave, and a spectrum band thereof exceeds, for example, 1 THz. In such a configuration, however, since a refractive index in the crystal for the input pump light and that for the output THz wave are different, walk-off occurs. In this case, since the pump light and the THz wave are separated as they propagate in the crystal, the THz wave cannot be efficiently generated.

On the other hand, in the periodically poled crystal, as schematically illustrated in FIG. 3, the polarization in the crystal is inverted in a period of a walk-off distance. At this time, a half-cycle THz wave pulse is generated from each of the polarization regions 55A and 55B. Further, since the polarization is inverted with a constant inversion period Λ, the THz wave pulses with positive and negative opposite amplitudes are generated in series. Therefore, in the wavelength conversion element 50, only the THz wave component of the frequency corresponding to a polarization inversion period Λ remains, and a highly-monochromatic output THz wave pulse may be obtained.

In the periodically poled crystal, it is possible to generate the THz waves of different frequencies f according to the position x in the crystal by making a plurality of periodically poled regions with different inversion periods Λ in one crystal as in the above-described fan-out structure. For example, in Non-Patent Document 5, a periodically poled crystal having a fan (fan-out) structure in which a polarization inversion period Λ is linearly changed is reported.

An object of the technology disclosed in this document is spectroscopy by optical parametric oscillation (OPO) using the fan-out PPLN, and an oscillation wavelength of the OPO is tuned by controlling an incident position of the pump light pulse on the PPLN. In the PPLN, the inversion period Λ is configured to change linearly with respect to the position x within a range from 29.3 μm to 30.1 μm, and a change angle in the periodically poled structure is 2°.

Further, in Non-Patent Document 6, a periodically poled crystal having a chirp domain structure is reported. In the technology disclosed in this document, a THz wave having a wide spectrum is generated by linearly changing an inversion period Λ with respect to a propagating direction of laser light.

Figure 4:
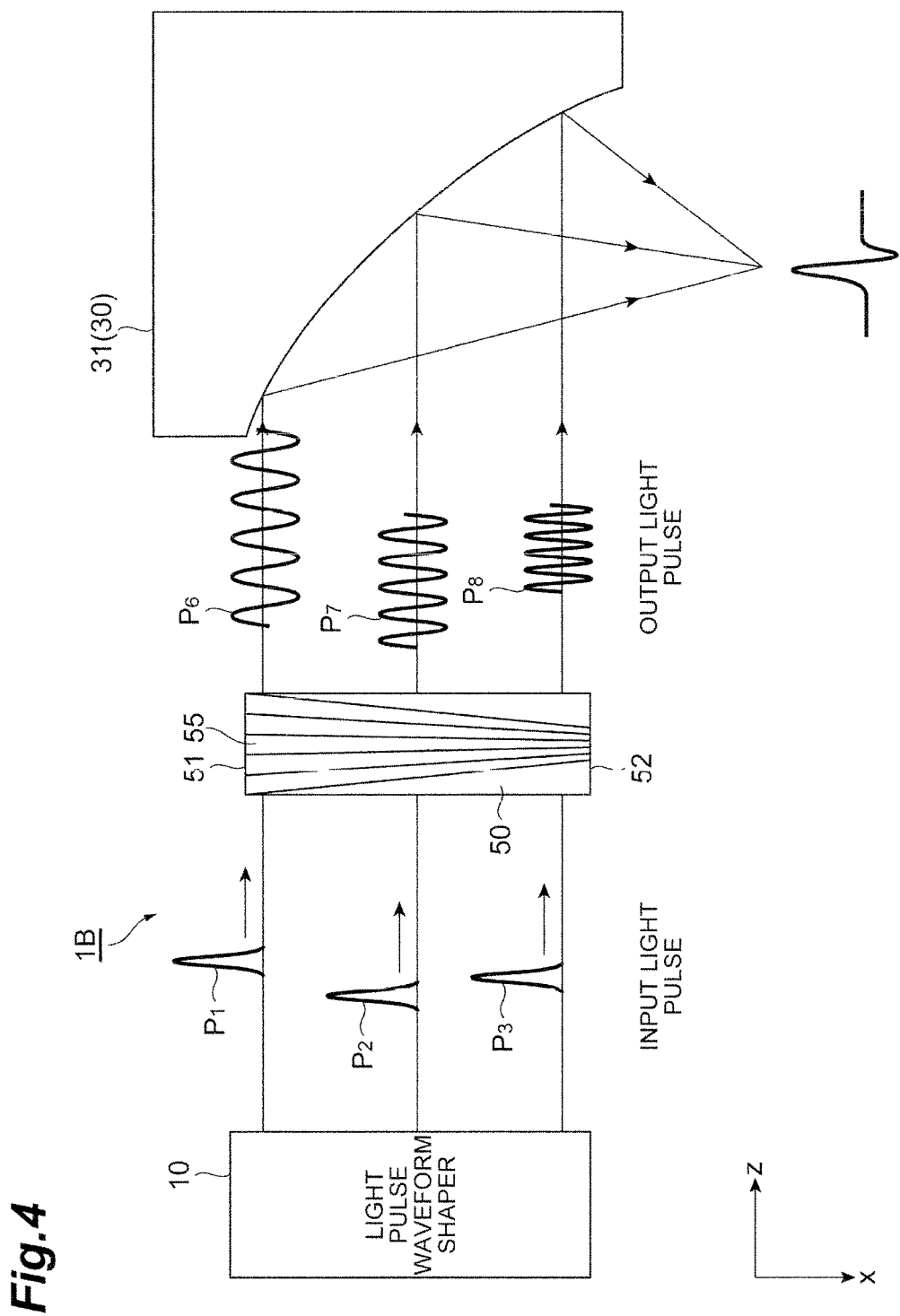
FIG. 4 is a view illustrating an example of a configuration of a wavelength conversion light pulse waveform shaping device using the light pulse waveform shaper and the wavelength conversion element.

FIG. 4 is a view illustrating an example of a configuration of the wavelength conversion light pulse waveform shaping device using the light pulse waveform shaper illustrated in FIG. 1 and the wavelength conversion element including the above-described fan-out periodically poled crystal.

A wavelength conversion light pulse waveform shaping device 1B of the present configuration example includes the light pulse waveform shaper 10, the wavelength conversion element 50 formed of the fan-out periodically poled crystal, and an off-axis parabolic mirror 31 being an output optical system 30. The pump light pulse after the waveform shaping output from the light pulse waveform shaper 10 is incident on the wavelength conversion element 50 as the input light pulse of the wavelength conversion object. As described above, the inversion period Λ(x) in the periodically poled crystal forming the wavelength conversion element 50 linearly changes with respect to the position x, therefore, a boundary of each polarization region 55 in the wavelength conversion element 50 is a straight line.

Here, in the spatial light modulator used in the waveform shaper 10, as described above with reference to FIG. 2, the x-axis is the spatial axis and the y-axis is the wavelength axis. The pump light beam is divided in the spatial axis direction and a phase modulation pattern which gives predetermined time delay along the wavelength axis is presented on the modulation plane of the spatial light modulator. According to this, it is possible to give arbitrary time delay to each light pulse component of the divided pump light as schematically illustrated by an input light pulse component $P_1$ incident on a first end 51 side of the wavelength conversion element 50, an input light pulse component $P_2$ incident on a central portion, and an input light pulse component $P_3$ incident on a second end 52 side in FIG. 4.

The output THz wave pulse generated at each position x of the crystal forming the wavelength conversion element 50 has different frequency components depending on the position x as schematically illustrated by an output light pulse component $P_6$ emitted from the first end 51 side of the wavelength conversion element 50, an output light pulse component $P_7$ emitted from the center portion, and an output light pulse component $P_8$ emitted from the second end 52 side in FIG. 4. For example, on the first end 51 side of the wavelength conversion element 50, the inversion period Λ(x) is large and the frequency f(x) of the obtained output light pulse component $P_6$ is small. On the other hand, on the second end 52 side of the wavelength conversion element 50, the inversion period Λ(x) is small and the frequency f(x) of the obtained output light pulse component $P_8$ is large.

Then, by combining the output light pulse components from the respective positions x of the wavelength conversion element 50 by using the output optical system 30 such as the off-axis parabolic mirror 31, a final wavelength conversion THz wave pulse is obtained at a light focusing point of the output optical system 30. With such a configuration, by controlling the time delay and the intensity of each component of the input light pulse, the phase and the amplitude of the THz wave pulse including the frequency component corresponding to this may be controlled.

However, in the wavelength conversion light pulse waveform shaping device 1B having the configuration illustrated in FIG. 4, for example, in a case where the spatial light modulator is used in the light pulse waveform shaper 10 on a preceding stage of the wavelength conversion element 50 and the like, there is the following problem regarding frequency allocation to each pixel of the spatial light modulator.

Figure 5:
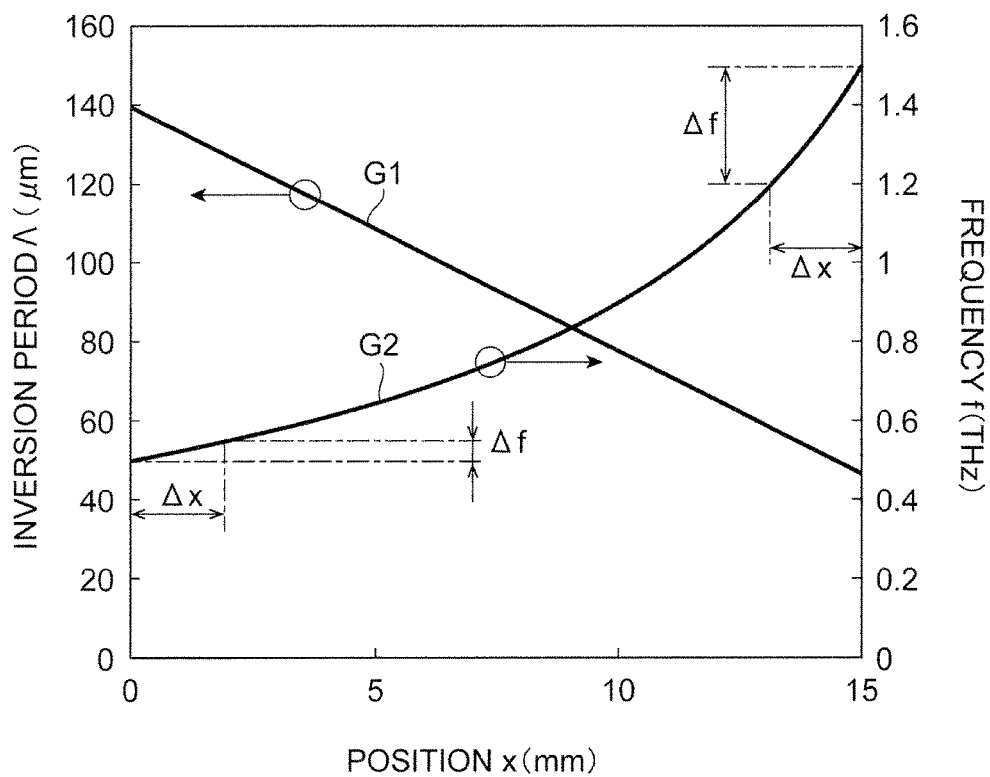
FIG. 5 is a graph illustrating change in polarization inversion period in the wavelength conversion element and frequency of an output light pulse according to a position in a crystal.

FIG. 5 is a graph illustrating change in the polarization inversion period in the fan-out wavelength conversion element illustrated in FIG. 4 and the frequency of the output light pulse according to the position in the crystal. In the graph of FIG. 5, the horizontal axis represents the position x (mm) along the x-axis in the periodically poled crystal forming the wavelength conversion element 50, and the vertical axis represents the polarization inversion period Λ (μm) in the crystal or the frequency f (THz) of the output light pulse. In FIG. 5, a graph G1 illustrates dependency of the polarization inversion period Λ on the position x, and a graph G2 illustrates dependency of the frequency f of the output light pulse on the position x. Further, here, periodically poled lithium tantalate (PPLT: periodically poled LiTaO$_3$) is assumed as the crystal of the wavelength conversion element.

The polarization inversion period Λ in the periodically poled crystal and the frequency f of the output light pulse obtained by the wavelength conversion in the crystal have a relationship represented by the following formula (1) (refer to Non-Patent Document 7).

$$f(x) = \frac{c}{\Lambda(x)\Delta n} \quad (1)$$

Here, in the formula (1), c represents a speed of light, Δn represents a difference in refractive index $\Delta n = \Delta n_- = n_{out} - n_{in}$ between a refractive index $n_{in}$ of the crystal for the input light pulse and a refractive index $n_{out}$ of the crystal for the output light pulse. At this time, the input direction of the input light pulse to the crystal of the wavelength conversion element 50 and the output direction of the output light pulse are the same direction. When the output light pulse is the THz wave pulse, $n_{out} = n_{THz}$ is satisfied. Here, the input direction of the input light pulse to the crystal and the output direction of the output light pulse may also be opposite to each other. In this case, Δn in the formula (1) described above is the sum of the refractive indices $\Delta n = \Delta n_+ = n_{out} + n_{in}$.

In the fan-out wavelength conversion element 50 illustrated in FIG. 4, the polarization inversion period Λ(x) in the crystal linearly changes with respect to the position x as illustrated by the graph G1 in FIG. 5. The frequency f(x) of the output light pulse changes in a curved manner based on the formula (1) described above corresponding to the change in the inversion period $\Lambda(x)$ as illustrated by the graph G2 in FIG. 5. In such a configuration, as illustrated in the graph in FIG. 5, frequency change $\Delta f$ with respect to change $\Delta x$ in the position x is small on the first end 51 side of the wavelength conversion element 50. On the other hand, on the second end 52 side, frequency change $\Delta f$ with respect to change $\Delta x$ in the position x is large.

As a specific configuration, when using the above-described PPLT crystal as the crystal of the wavelength conversion element, the wavelength of the input pump light pulse is, for example, 800 nm, and the refractive indices of the crystal for the input and output light pulses are $n_{in}=2.2$ and $n_{out}=n_{THz}=6.4$, respectively. Here, an ultrashort pulse laser light source of the order of fs is preferably used as a pulse light source which supplies the input light pulse serving as the pump light for THz wave generation. As such a pulse laser light source, for example, there are a mode-locked titanium sapphire laser (center wavelength of 800 nm), an ytterbium fiber laser (center wavelength of 1030 nm), an erbium fiber laser (center wavelength of 1550 nm), and the like.

Here, it is assumed that a frequency range of the THz wave pulse which is to be generated in the wavelength conversion element 50 illustrated in FIG. 4 is $f_1$ to $f_2$. The frequency $f_1$ is the minimum frequency of the THz wave generated on the first end 51 of the wavelength conversion element 50, and the frequency $f_2$ is the maximum frequency of the THz wave generated on the second end 52. Further, the frequencies $f_1$ and $f_2$ are specifically set to $f_1=0.5$ THz and $f_2=1.5$ THz, respectively, and the frequency allocation to each pixel of the spatial light modulator at this time is considered.

Specifically, for example, 16 pixels in a two-dimensional pixel array in the spatial light modulator used in the waveform shaper 10 on the preceding stage is considered. Assuming that a pixel pitch in the modulator is 12.5 µm, the length of the 16 pixels is 0.2 mm. A size of the crystal used in the wavelength conversion element 50 is set to, for example, 15 mm in width, 4.5 mm in length, and 1 mm in thickness.

In this case, the frequency allocation per 16 pixels in the spatial light modulator is $\Delta f=0.005$ THz in the region corresponding to the first end 51 of the wavelength conversion element 50 where the frequency of the output light pulse is minimum $f_1=0.5$ THz. Further, $\Delta f=0.05$ THz in the region corresponding to the second end 52 where the frequency of the output light pulse is maximum $f_2=1.5$ THz. In this manner, since the inversion period $\Lambda$ and the frequency f are in a reciprocal relationship, $\Delta f$ is large on a high frequency side, and $\Delta f$ is small on a low frequency side. Here, in FIG. 5, in order to make a difference in $\Delta f$ at each frequency easy to understand, the magnitude of $\Delta x$ is emphasized.

That is, in the above-described configuration, since the frequency allocation $\Delta f$ to the pixel of the spatial light modulator changes non-linearly with respect to the frequency f, the waveform shaping control becomes complicated. Further, considering a case where $\Delta f=0.05$ THz, the number of divisions of the frequency becomes $(1.5-0.5)/0.05=20$, and the number of divisions decreases. If the number of the frequency divisions is small in this manner, a degree of freedom of the waveform shaping becomes low.

Such problem arises because the allocation by frequency is considered. In the configuration illustrated in FIG. 4, when allocation by wavelength $\Delta\lambda$ is considered, this is uniform in the crystal direction. However, in a case of coherent control, it is preferable to control the waveform shaping of the THz wave by not the wavelength but the frequency for controlling a quantum state in consideration of an energy level. Since precise control regarding the frequency is required, it is preferable that the frequency allocation $\Delta f$ is fine and uniform. Further, such a problem of the frequency allocation also arises similarly in a case where the modulation element other than the spatial light modulator is used in the waveform shaper 10. The wavelength conversion element and the wavelength conversion light pulse waveform shaping device described below solve such problem.

Figure 6:
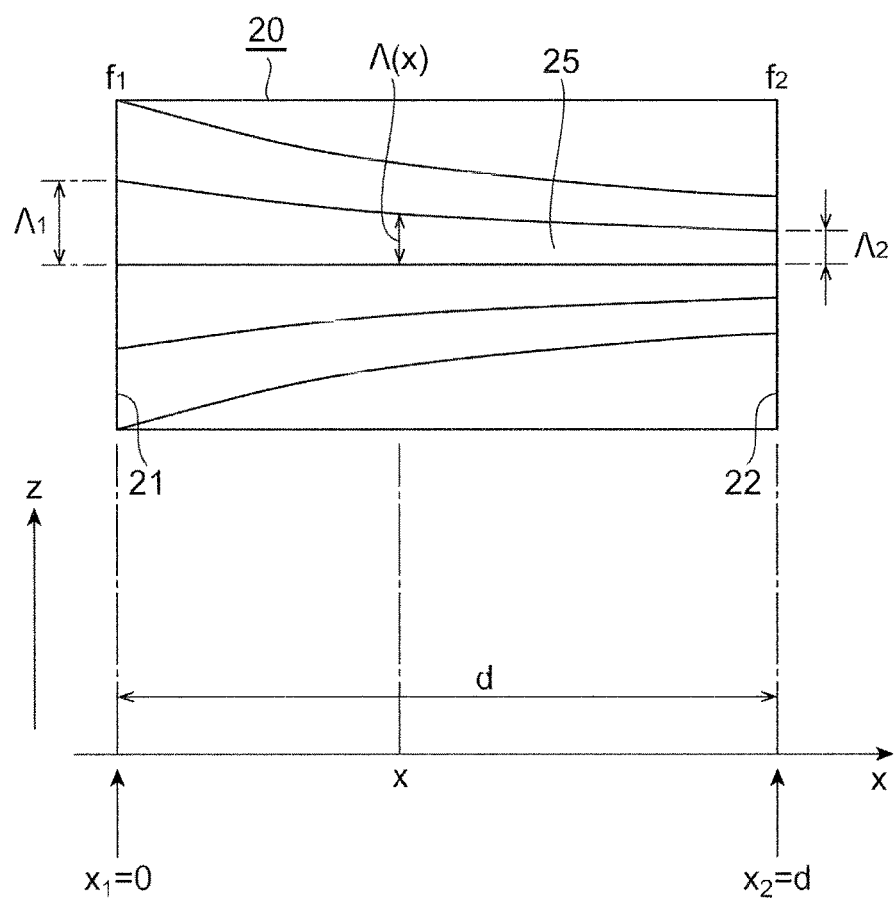
FIG. 6 is a plan view illustrating a configuration of an embodiment of the wavelength conversion element.

FIG. 6 is a plan view illustrating a configuration of an embodiment of the wavelength conversion element. A wavelength conversion element 20 according to the present embodiment is formed of a crystal having a periodically poled structure in which the polarization is inverted with a predetermined inversion period $\Lambda$ along the z-axis, with respect to the x-axis (first axis) and the z-axis (second axis) perpendicular to the x-axis which is the input axis of the input light pulse of the wavelength conversion object.

The periodically poled crystal of the wavelength conversion element 20 is configured to generate the output light pulse obtained by the wavelength conversion from the input light pulse with the output frequency f(x) corresponding to the inversion period $\Lambda(x)$ at each position x, with the inversion period $\Lambda$ changing as $\Lambda(x)$ according to the position x along the x-axis. Here, in the crystal of the wavelength conversion element 20 in FIG. 6, the individual polarization region forming the periodically poled structure is represented by a region 25.

Here, the problem of the frequency allocation in the wavelength conversion element described above arises because the polarization inversion period $\Lambda$ linearly changes with respect to the position x in the periodically poled crystal having the fan-out structure in the conventional wavelength conversion element. On the other hand, in the wavelength conversion element 20 according to the present invention, the problem of the frequency allocation is solved by configuring such that not the inversion period $\Lambda$ but the output frequency f linearly changes with respect to the position x.

That is, in the configuration illustrated in FIG. 6, regarding the change of the polarization inversion period $\Lambda(x)$ and the output frequency f(x) of the output light pulse according to the position x, a target frequency $f_T(x)$ linearly changing with the position x is set by the following formula (2).

$$f_T(x) = b + ax \quad (2)$$

Here, a and b are constants, respectively.

Further, when a frequency width of the output frequency at the position x is set to $\delta f(x)$, and an actual output frequency f(x) with respect to the target frequency $f_T(x)$ is set by the following formula (3), $$f(x) = f_T(x) + \alpha(x) \quad (3)$$

the output frequency f(x) is set so as to coincide with the target frequency $f_T(x)$ within a range in which a condition of the following formula (4) is satisfied.

$$|\alpha(x)| \leq \delta f(x) \quad (4)$$

At this time, the polarization inversion period $\Lambda(x)$ at the position x in the periodically poled crystal forming the wavelength conversion element 20 may be obtained by the following formula (5) based on the output frequency f(x), $$\Lambda(x) = \frac{c}{f(x)\Delta n} \quad (5)$$

by setting the speed of light to c, the refractive index of the crystal for the input light pulse to $n_{in}$, the refractive index of the crystal for the output light pulse to $n_{out}$, and the difference between the refractive indices to $\Delta n = n_{out} - n_{in}$ (refer to the formula (1)). Here, in a case where the input direction of the input light pulse and the output direction of the output light pulse are opposite to each other, $\Delta n$ in the formula (5) is the sum of the refractive indices $\Delta n = n_{out} + n_{in}$ as described above.

Figure 7:
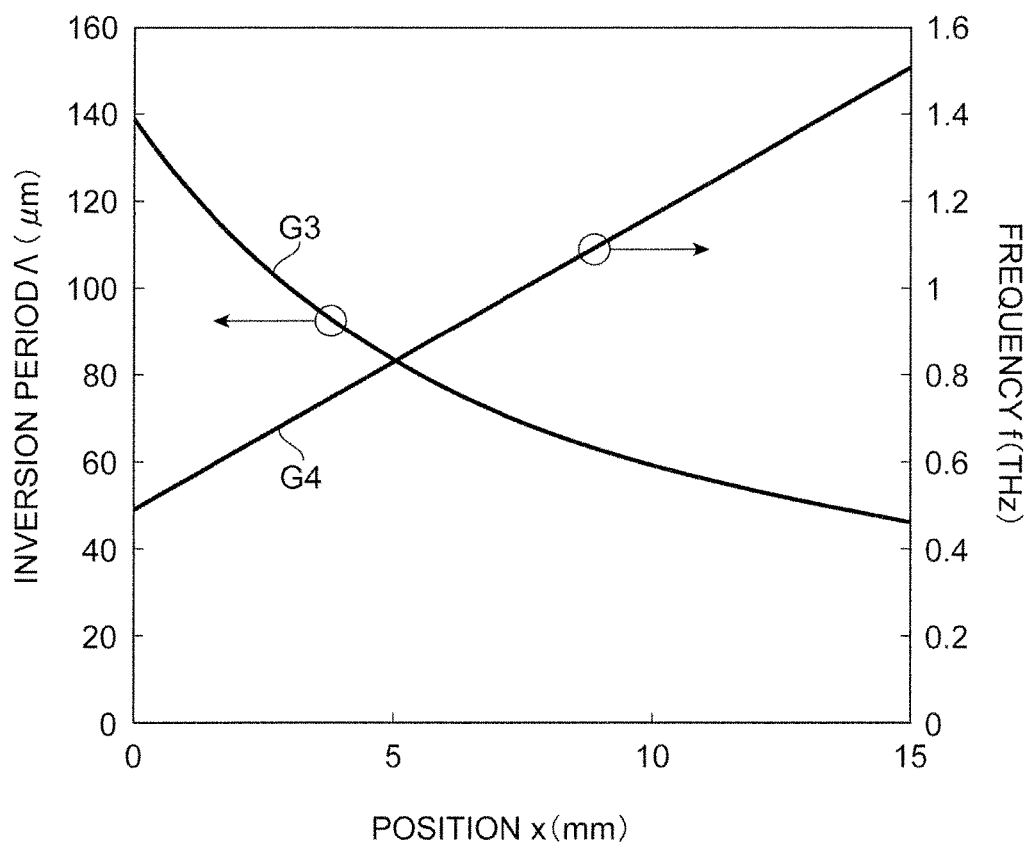
FIG. 7 is a graph illustrating change in polarization inversion period in the wavelength conversion element and frequency of the output light pulse according to the position in the crystal.

FIG. 7 is a graph illustrating change of the polarization inversion period and the frequency of the output light pulse according to the position in the crystal in the wavelength conversion element having the structure illustrated in FIG. 6. In the graph in FIG. 7, the horizontal axis represents the position x (mm) in the periodically poled crystal forming the wavelength conversion element 20 and the vertical axis represents the polarization inversion period $\Lambda$ (μm) in the crystal or the frequency f (THz) of the output light pulse. Further, in FIG. 7, a graph G3 illustrates dependency of the polarization inversion period $\Lambda$ on the position x and a graph G4 illustrates dependency of the frequency f of the output light pulse on the position x.

In the configuration described above, if it is considered that the output frequency substantially coincides with the target frequency, the output frequency f(x) linearly changes with respect to the position x as illustrated by the graph G4. At this time, the inversion period $\Lambda(x)$ in the periodically poled crystal changes in a curved manner with respect to the position x as illustrated by the graph G3, and accordingly, the boundary of each polarization region 25 in the wavelength conversion element 20 is a curve as illustrated in FIG. 6.

Further, the target frequency $f_T(x)$ may be specifically set by the following formula (6), $$f_T(x) = f_1 + \frac{f_2 - f_1}{d} x \quad (6)$$

by setting the constants a and b to $a=(f_2-f_1)/d$ and $b=f_1$, respectively, when the target frequency on the first end 21 of the crystal which is an origin of the position x along the x-axis is set to $f_1$, the target frequency on the second end 22 on the side opposite to the first end 21 is set to $f_2$, and the width from the first end 21 to the second end 22 along the x-axis of the crystal is set to d.

Here, in the configuration illustrated in FIG. 6, regarding the inversion period $\Lambda(x)$, the inversion period $\Lambda_1 = \Lambda(0)$ on the first end 21 ($x_1=0$) of the wavelength conversion element 20 is the maximum period, and the inversion period $\Lambda_2 = \Lambda(d)$ on the second end 22 ($x_2=d$) is the minimum period. Further, regarding the output frequency f(x), the output frequency $f_1 = f(0)$ on the first end 21 is the minimum frequency, and the output frequency $f_2 = f(d)$ on the second end 22 is the maximum frequency. Here, the setting of the inversion period $\Lambda$ and the maximum and minimum values of the output frequency f are not limited to such a configuration.

For example, when the PPLT crystal described above is used as the crystal of the wavelength conversion element 20, if the wavelength of the input pump light pulse is set to 800 nm and the frequency of the output THz wave pulse is set to 1 THz (wavelength of 300 μm), the refractive index difference is $\Delta n = 4.3$. At this time, assuming that the output frequencies are $f_1 = 0.5$ THz and $f_2 = 1.5$ THz, and the crystal width is d=15 mm, the relationship between the inversion period $\Lambda$ and the output frequency f is as illustrated by the graph of FIG. 7.

Effects of the wavelength conversion element 20 according to the above embodiment will be described.

In the wavelength conversion element 20 illustrated in FIG. 6, the crystal having the periodically poled structure along the z-axis (second axis) being the input axis of the input light pulse is used as a wavelength conversion medium, and the polarization inversion period $\Lambda$ in the crystal is configured to change as $\Lambda(x)$ according to the position x along the x-axis (first axis). With such a configuration, it is possible to obtain the light pulse in which the output frequency f(x) changes according to the position x in the output light pulse after the wavelength conversion.

Furthermore, in such a configuration, regarding the change in the inversion period $\Lambda(x)$ according to the position x along the x-axis, the target frequency $f_T(x)$ linearly changing with the position x is set and the actual output frequency f(x) is set so as to coincide with the target frequency in a predetermined range. According to such a configuration, it is possible to realize the wavelength conversion element capable of being preferably applied to the waveform shaping of the output light pulse such as the THz wave pulse. For example, in a case where the wavelength conversion element 20 having the above-described configuration is used in combination with the waveform shaper including the spatial light modulator, the frequency allocation to the pixels of the spatial light modulator becomes uniform and the waveform shaping may be easily controlled. Further, since the frequency allocation is fine and uniform, it is possible to sufficiently secure the number of frequency divisions.

Here, in the above-described wavelength conversion element, regarding the setting of the target frequency $f_T(x)$, specifically, it may be configured such that the target frequency is set by the following formula $$f_T(x) = f_1 + ((f_2 - f_1)/d) \times x$$

as described above. Further, regarding the inversion period $\Lambda$ corresponding to the output frequency f at each position x, as described above, the polarization inversion period $\Lambda(x)$ may be configured to be determined by the following formula $$\Lambda(x) = c/(f(x)\Delta n)$$

based on the output frequency f(x).

Further, the output frequency f(x) may be configured to be set to substantially coincide with to the target frequency $f_T(x)$. Further, regarding the setting of the output frequency with respect to the target frequency, it is preferable to take an effect of manufacturing precision, a manufacturing error and the like of the periodically poled structure when actually manufacturing the crystal of the wavelength conversion element into consideration.

Further, the output light pulse generated by the wavelength conversion of the input light pulse may be, specifically for example, a terahertz (THz) wave pulse with the output frequency of 0.1 THz or more and 10 THz or less. In addition, the output light pulse may also be the light pulse other than the THz wave pulse, for example, an arbitrary light pulse with the wavelength longer than that of the input light pulse.

Further, a material of the periodically poled crystal forming the wavelength conversion element may be, for example, lithium niobate $LiNbO_3$ or lithium tantalate $LiTaO_3$. Such crystal material may be preferably used, for example, in generation of the THz wave pulse by the wavelength conversion. Here, the material of the periodically poled crystal is not limited to the above-described materials, and various materials may be used as long as the periodically poled structure may be fabricated. Further, it is necessary to appropriately set the polarization inversion period Λ according to the material.

Further, in the wavelength conversion element, the crystal may be configured to include at least a first crystal region in which the target frequency is set to $$f_{T1}(x)=b_1+a_1x \text{ (}a_1 \text{ and } b_1 \text{ are constants)}$$

and a second crystal region in which the target frequency is set to $$f_{T2}(x)=b_2+a_2x \text{ (}a_2 \text{ and } b_2 \text{ are constants)}$$

along the x-axis. Further, the wavelength conversion element may be formed by stacking a plurality of crystals having the periodically poled structure. Further, the wavelength conversion element may be formed while shifting the center position in the z-axis (optical axis) direction of the periodically poled structure at each position x along the x-axis from the center position of the crystal according to the output frequency f(x) at the position x. Here, the configuration having a plurality of crystal regions, the configuration of stacking a plurality of crystals, and the configuration of shifting the center position of the periodically poled structure are specifically described later.

The configuration of the wavelength conversion element 20 according to the above embodiment will be further described. First, the frequency width δf(x) which determines the setting range of the output frequency f(x) with respect to the target frequency $f_T(x)$ is described. It is preferable that the frequency f(x) of the output light pulse obtained by the wavelength conversion element 20 substantially coincides with the target frequency $f_T(x)$ linearly changing with the position x. In practice, however, there is the manufacturing error in the crystal forming the wavelength conversion element 20, and it is necessary to set an allowable range of the inversion period Λ(x) and the output frequency f(x) in consideration of this.

Figure 8A:
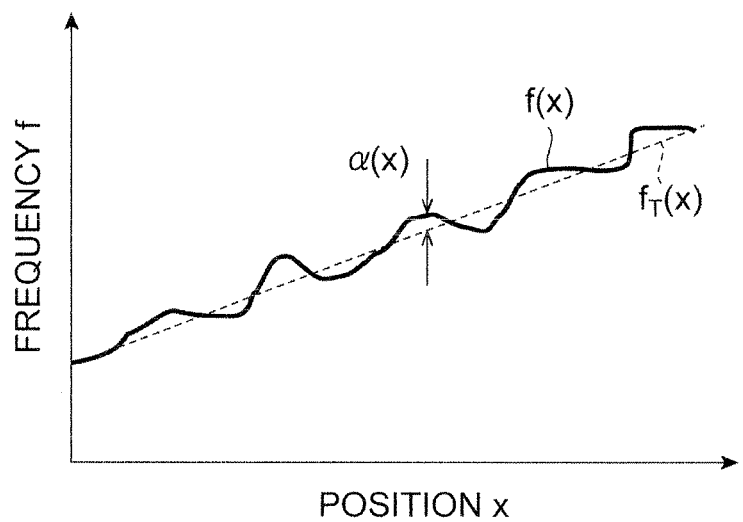
FIG. 8A and FIG. 8B are graphs illustrating (A) change in the frequency of the output light pulse according to the position in the crystal in the wavelength conversion element, and (B) a frequency width of the output light pulse.

As described above, in a case where the output frequency f(x) with respect to the target frequency $f_T(x)$ is set as $$f(x)=f_T(x)+\alpha(x),$$

α(x) corresponds to an error of the output frequency caused by the manufacturing error of the crystal and the like. Here, FIG. 8A is a graph illustrating the change by the position x in the crystal of the frequency f of the output light pulse in the wavelength conversion element 20, and illustrating a relationship of the target frequency $f_T(x)$, the output frequency f(x), and the frequency error α(x).

If there is such error α(x), if an absolute value of α(x) is the frequency width δf(x) of the output frequency or less at an arbitrary position x, a problem in the control of the wavelength conversion and waveform shaping does not arise. Therefore, it is preferable that the frequency error α(x) satisfies the condition $$|\alpha(x)|\le\delta f(x)$$

as described above.

Figure 8B:
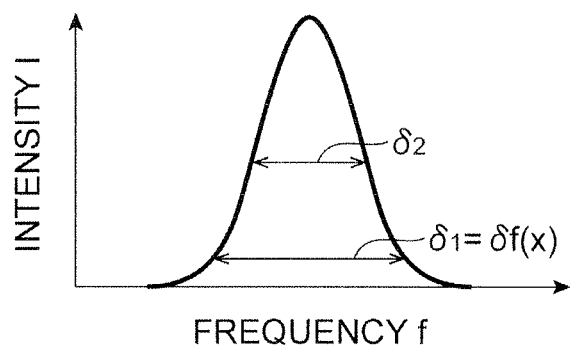

FIG. 8B is a graph illustrating the frequency width δf(x) of the output light pulse. In general, a frequency spectrum of the output THz wave pulse obtained by the wavelength conversion element 20 has a Gaussian function shape. In such a case, the frequency width δf(x) which is the allowable range of the output frequency may be the width when the intensity in the frequency spectrum of the output light pulse is $1/e^2$ with respect to the peak intensity as indicated by $\delta_1$ in the graph in FIG. 8B.

The frequency width δf(x) may also be a full width at half maximum of the intensity in the frequency spectrum of the output light pulse as indicated by $\delta_2$ in the graph in FIG. 8B according to the condition such as the manufacturing error of the actual crystal. Here, the frequency spectrum of the output THz wave pulse is not limited to the shape of the Gaussian function described above, but may be defined as, for example, a shape of the sech function or a shape of the Lorentz function. Further, as an example of a specific value of the frequency width δf(x), δf of 0.05 THz is obtained as the full width at half maximum of the THz wave spectrum at room temperature of 300K in Non-Patent Document 8.

Next, a change profile of the inversion period Λ(x) along the x-axis in the periodically poled crystal is described. It is possible to control the frequency spectrum of the obtained output THz wave pulse by appropriately setting and controlling the change profile of the inversion period in the periodically poled crystal forming the wavelength conversion element.

Figure 9:
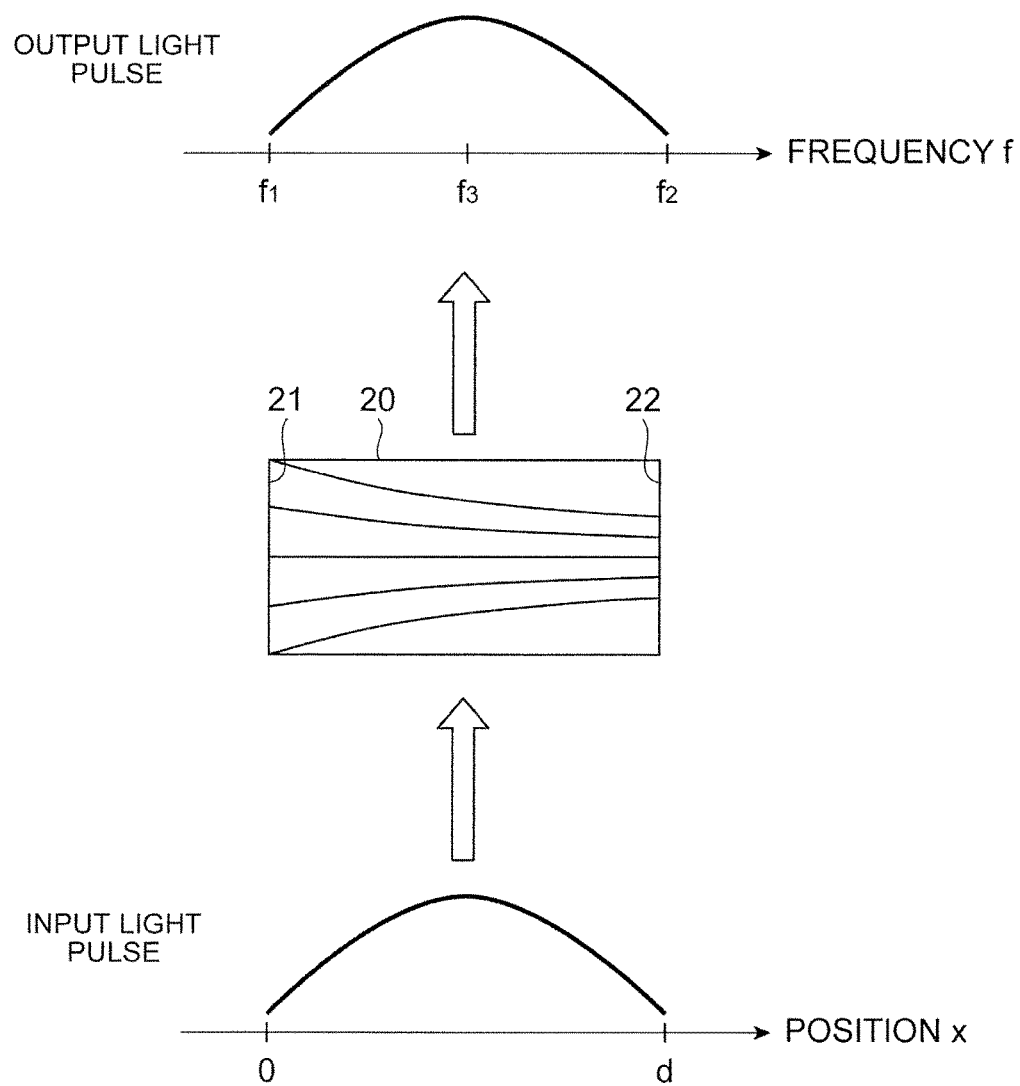
FIG. 9 is a view illustrating an example of a configuration of the wavelength conversion element and the wavelength conversion of the light pulse.

FIG. 9 is a view illustrating an example of the configuration of the wavelength conversion element 20 and the wavelength conversion of the light pulse by the wavelength conversion element 20. In the configuration example illustrated in FIG. 9, the wavelength conversion element 20 having the configuration illustrated in FIG. 6 is used. In the wavelength conversion of the light pulse by this wavelength conversion element 20, as schematically illustrated in FIG. 9, the intensity profile according to the position x of the input light pulse is transferred to the frequency spectrum of the output light pulse.

In such a configuration, when the intensity distribution of the input light pulse is Gaussian distribution, the intensity of the input light pulse increases at the center portion of the crystal of the wavelength conversion element 20. In this case, in the obtained output light pulse, a component of a frequency $f_3$ between the frequency $f_1$ on the first end 21 and the frequency $f_2$ on the second end 22, for example, the center frequency $(f_1+f_2)/2$ of the frequencies $f_1$ and $f_2$ becomes large, and components of the frequencies $f_1$ and $f_2$ on both ends become small.

While taking such point into consideration, when controlling the frequency spectrum of the output light pulse, it is necessary to arbitrarily change the intensity distribution of the input light pulse, however, such intensity control is difficult in many cases. In such a case, by controlling the change profile of the inversion period Λ(x) in the periodically poled crystal of the wavelength conversion element 20, it is possible to control the spectrum of the output light pulse.

Figure 10:
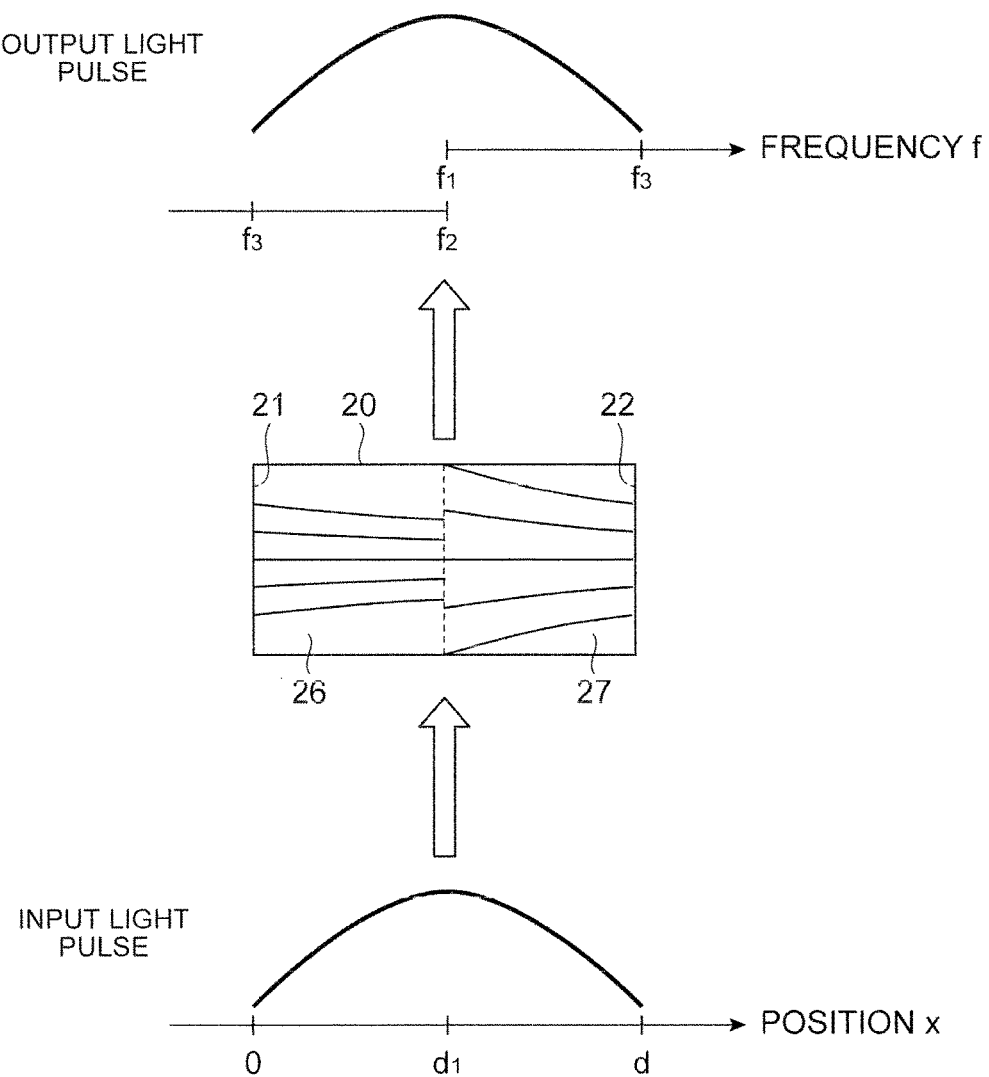
FIG. 10 is a view illustrating another example of the configuration of the wavelength conversion element and the wavelength conversion of the light pulse.

FIG. 10 is a view illustrating another example of the configuration of the wavelength conversion element 20 and the wavelength conversion of the light pulse by the wavelength conversion element 20. In the configuration example illustrated in FIG. 10, the crystal having the configuration illustrated in FIG. 9 is divided at the center position between the first end 21 and the second end 22 corresponding to the output frequency $f_3$, and the crystal region on the second end 22 side in FIG. 9 is made a first crystal region 26 on the first end 21 side, and the crystal region on the first end 21 side in FIG. 9 is made a second crystal region 27 on the second end 22 side.

In such a configuration, assuming that the boundary position between the crystal regions 26 and 27 is set to $x=d_1$, the target frequency $f_{T1}(x)$ corresponding to the output frequency in the first crystal region 26 is set by the following formula (7)

$$f_{T1}(x) = f_3 + \frac{f_2 - f_3}{d_1} x \quad (0 \leq x \leq d_1) \tag{7}$$

within a range of $0 \leq x \leq d_1$. Further, similarly, the target frequency $f_{T2}(X)$ corresponding to the output frequency in the second crystal region 27 is set by the following formula (8)

$$f_{T2}(x) = f_1 + \frac{f_3 - f_1}{d - d_1}(x - d_1) \quad (d_1 \leq x \leq d) \tag{8}$$

within a range of $d_1 \leq x \leq d$.

In this manner, in the periodically poled crystal of the wavelength conversion element 20, in the configuration in which the crystal structures on the right and left sides are replaced with each other, the components of the frequencies $f_1$ and $f_2$ are generated at the center portion of the crystal in which the intensity of the input light pulse is large. According to this, the spectrum of the output light pulse may be controlled.

Figure 11A:
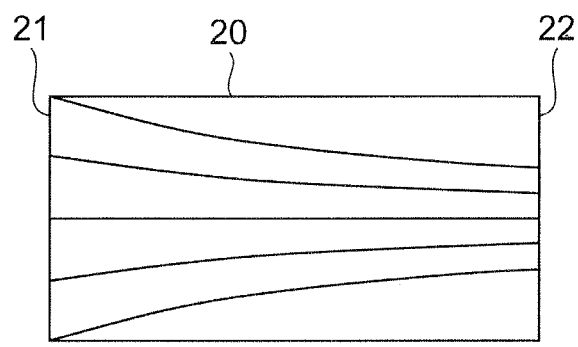
FIG. 11A and FIG. 11B are views illustrating still other examples of the configuration of the wavelength conversion element.
Figure 11B:
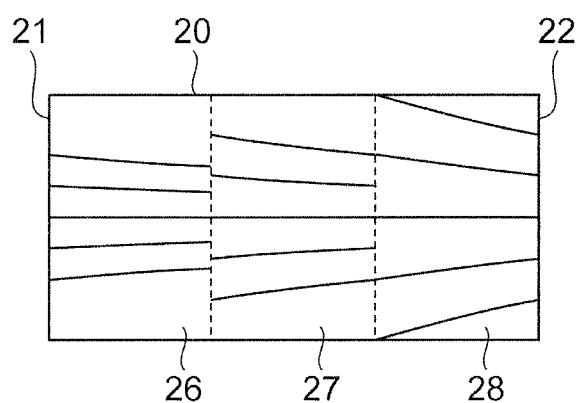

Here, in this manner, in the configuration of dividing the crystal of the wavelength conversion element 20 into a plurality of crystal regions having different target frequency settings, it is also possible to configure to include three or more crystal regions as necessary. FIG. 11A and FIG. 11B are views illustrating still other examples of the configuration of the wavelength conversion element 20. Here, the wavelength conversion element 20 having the structure similar to that in FIG. 6 illustrated in FIG. 11A is divided into three, and as illustrated in FIG. 11B, the order of the divided crystal regions is changed such that the first crystal region 26, the second crystal region 27, and the third crystal region 28 are arranged in this order from the first end 21 side.

Next, a configuration of stacking a plurality of periodically poled crystals in the wavelength conversion element 20 is described. It is difficult for the periodically poled crystal to have a thickness of 1 mm or more in manufacturing. On the other hand, in a case of using a high-power laser light pulse as the input light pulse, there is a possibility that crystal is damaged when the light pulse is focusing on the periodically poled crystal.

Figure 12:
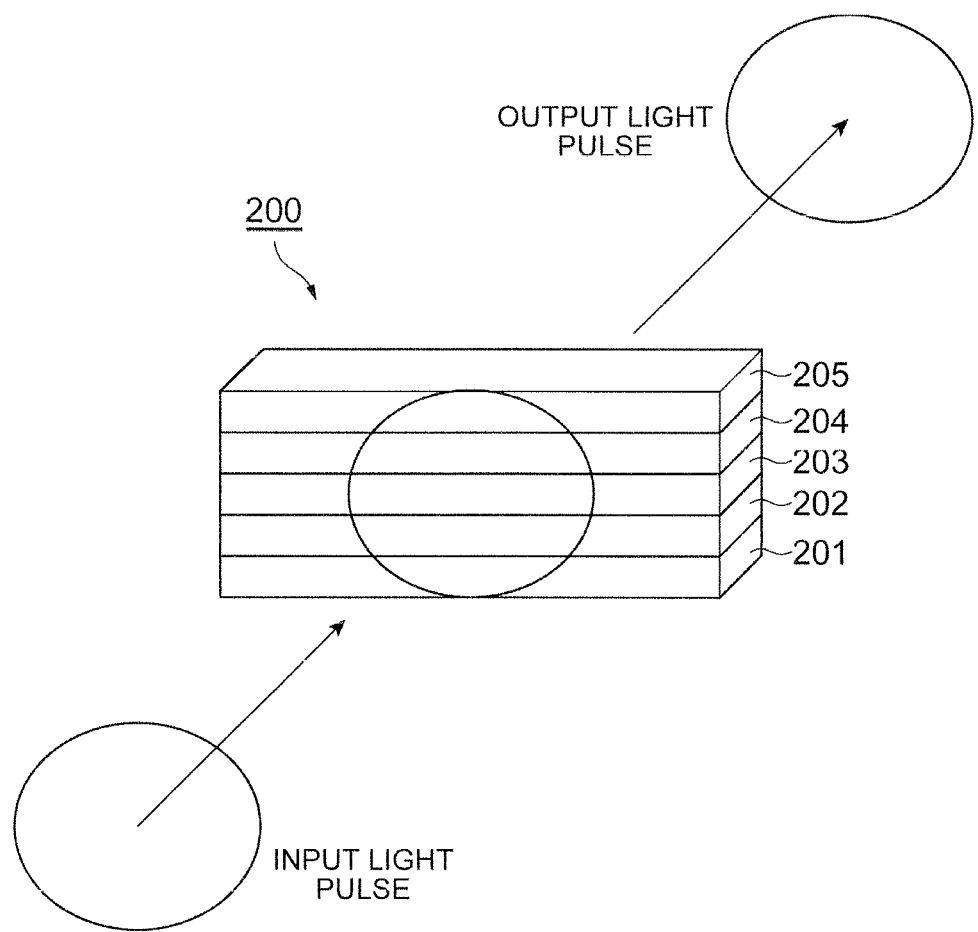
FIG. 12 is a view illustrating an example of a configuration of the wavelength conversion element in which a plurality of crystals are stacked.

In order to avoid such damage of the crystal, it is necessary that the input light pulse is not condensed and is incident on the crystal as a large-area light beam. However, since the periodically poled crystal has the thickness of approximately 1 mm as described above, a large part of the light beam is not incident on the crystal, and wavelength conversion efficiency is lowered. On the other hand, as in an example of the configuration of the wavelength conversion element in which a plurality of crystals are stacked illustrated in FIG. 12, when a plurality of periodically poled crystals are stacked to form the wavelength conversion element, an entire large-area light beam may be incident on the crystal. In the configuration example illustrated in FIG. 12, the wavelength conversion element 200 is formed by stacking five periodically poled crystals 201 to 205.

Next, a configuration of shifting the center position of the periodically poled structure in the wavelength conversion element 20 is described. In the wavelength conversion element 20 configured as described above, the periodically poled structure in the crystal may also be shifted in the z-axis direction (second axis direction) which is the optical axis direction. For example, when the THz wave generation using periodically poled crystal is taken into consideration, if the frequency of the output THz wave exceeds 1 THz, the THz wave is absorbed while propagating through the crystal.

In particular, when the output THz wave has a high frequency, an absorption coefficient in the crystal rapidly increases. In this case, if all the frequency components of the output THz wave are generated at the same position in the optical axis direction, the higher-frequency THz wave component is more absorbed by the crystal, and efficiency of the THz wave generation decreases. When taking such a point into consideration, it is preferable to generate the THz wave component of the higher frequency at a position closer to a rear side (output side) of the crystal when generating the output THz wave pulse in the periodically poled crystal. Further, in general, in the wavelength conversion element 20, the center position in the z-axis (second axis) direction of the periodically poled structure at each position x along the x-axis (first axis) is preferably shifted from the center position of the crystal according to the output frequency f(x) at the position x.

Figure 13A:
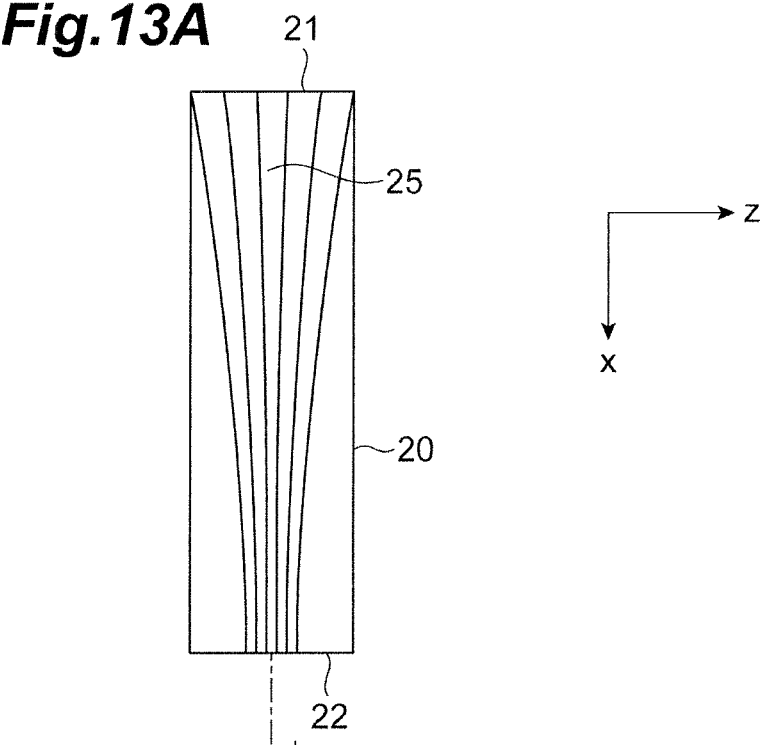
FIG. 13A to FIG. 13C are views illustrating still other examples of the configuration of the wavelength conversion element.
Figure 13B:
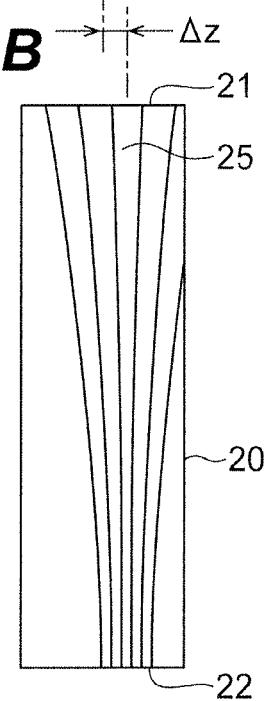
Figure 13C:
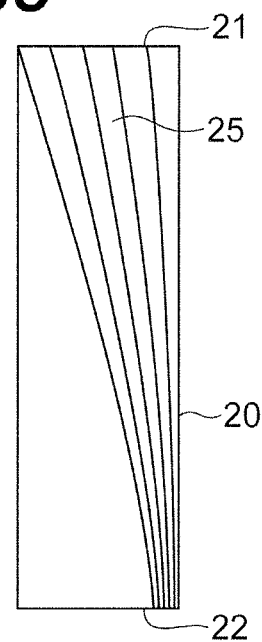

FIG. 13A to FIG. 13C are views illustrating still other examples of the configuration of the wavelength conversion element 20. FIG. 13A illustrates the wavelength conversion element 20 having the structure similar to that of FIG. 6. In this wavelength conversion element 20, the center position of the periodically poled structure in the z-axis direction substantially coincides with the center position of the crystal in the z-axis direction at all positions x.

On the other hand, in the configuration example illustrated in FIG. 13B, the center position of the periodically poled structure is shifted rearward from the center position by Δz in the z-axis direction at all positions x. By configuring in this manner, it is possible to suppress the absorption in the crystal of the high-frequency THz wave component. However, in this configuration example, in a region where the inversion period Λ is large on the first end 21 side of the crystal, the number of periods in the periodically poled structure decreases.

Further, in the configuration example illustrated in FIG. 13C, a shift amount toward the rear side of the center position of the periodically poled structure increases from the first end 21 side of the crystal toward the second end 22 side. According to such a configuration, it is possible to generate the high-frequency THz wave component on the rear side of the crystal to suppress the absorption of the THz wave component in the crystal and improve the efficiency of the THz wave generation, and further, maintain the number of periods in the periodically poled structure at all positions x by changing the shift amount of the center position according to the output frequency f(x) at the position x.

Figure 14:
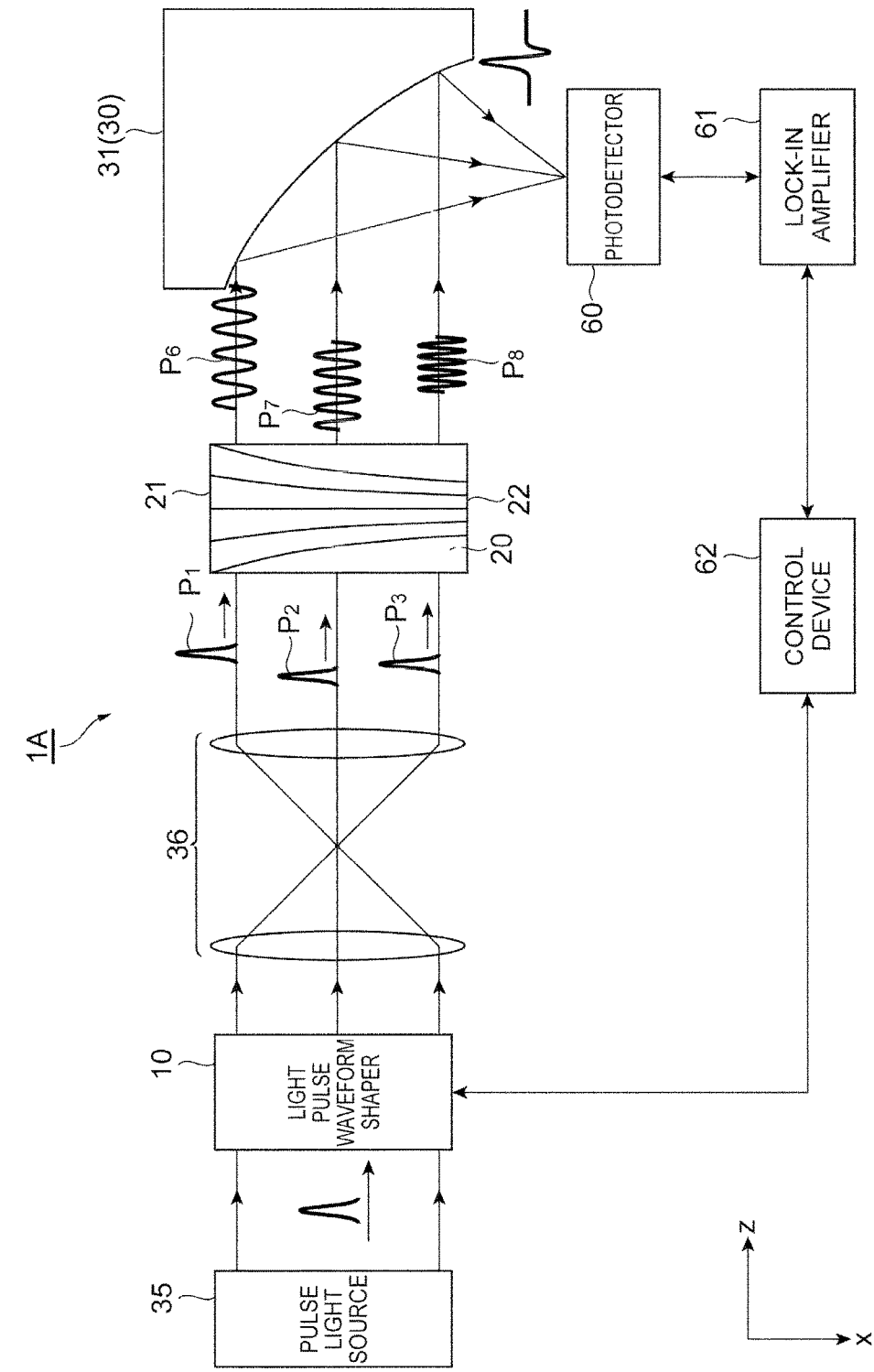
FIG. 14 is a view illustrating a configuration of an embodiment of the wavelength conversion light pulse waveform shaping device using the wavelength conversion element.

Next, the wavelength conversion light pulse waveform shaping device using the wavelength conversion element 20 having the above-described configuration will be described. FIG. 14 is a view illustrating a configuration of an embodiment of the wavelength conversion light pulse waveform shaping device using the wavelength conversion element 20. A wavelength conversion light pulse waveform shaping device 1A according to the present embodiment includes a pulse light source 35, the light pulse waveform shaper 10, an imaging lens system 36, the wavelength conversion element 20, the output optical system 30, a photodetector 60, a lock-in amplifier 61, and a control device 62. The waveform shaping device 1A may be used as, for example, a THz wave pulse waveform shaping device (THz wave pulse shaper).

The pulse light source 35 supplies a light pulse having a predetermined wavelength and a predetermined waveform, which is an initial light pulse for the waveform shaping by the light pulse waveform shaper 10 and the wavelength conversion by the wavelength conversion element 20. As the pulse light source 35, as described above, the pulse laser light source, for example, an ultrashort pulse laser light source in the order of fs is preferably used. As such a laser light source, for example, there is a mode-locked titanium sapphire laser, a mode-locked fiber laser, or the like. The shortest pulse width of the light pulse supplied from the pulse light source 35 is preferably 100 fs or less in order to efficiently generate the THz wave.

The initial light pulse supplied from the pulse light source 35 is input to the light pulse waveform shaper 10 as the light pulse of the waveform shaping object. The waveform shaper 10 controls at least the phase or the phase and the amplitude (intensity) of the initial light pulse to generate the input light pulse having a predetermined waveform at each position x along the x-axis to output to the wavelength conversion element 20. In FIG. 14, as in FIG. 4, the input light pulse components $P_1$, $P_2$, and $P_3$ are schematically illustrated.

As a specific configuration of the light pulse waveform shaper 10, for example, a configuration including the diffraction grating, the lens, and the phase mask such as the spatial light modulator (SLM) illustrated in FIG. 1 may be used. Further, as the waveform shaper 10, a configuration including the diffraction grating, a concave mirror, and the SLM may be used (for example, refer to Non-Patent Document 9). Further, as the waveform shaper 10, the fixed-pattern phase mask or the like may be used. Here, in order to increase the degree of freedom of the control of the waveform shaping, it is preferable to use the waveform shaper 10 having a programmable configuration using the SLM or the like. According to the configuration in which the waveform shaper 10 includes the SLM which controls at least the phase of the initial light pulse, the waveform shaping of the input light pulse and the waveform shaping of the output light pulse after the wavelength conversion can be preferably performed by using the SLM capable of controlling a waveform shaping pattern.

Here, as an example of the configuration of the waveform shaper 10, the light pulse waveform shaper including the diffraction grating, the concave mirror, and the SLM, supporting the light pulse with a pulse width of 10 fs, and having a wavelength spectrum band of 700 nm to 950 nm is considered. At this time, it is possible to set the number of lines of the diffraction grating to 300 g/mm, a focal length of the concave mirror to 181.5 mm, the number of pixels of the SLM to 1272×1020, and a size of an incident surface of the light pulse beam to 15.9 mm×12 mm.

In a case where the time delay is given for each position of the light pulse, for example, an echelon, a multi optical fiber or the like may be used as the waveform shaper 10. The echelon is a step-shaped reflection element capable of controlling the delay of the light pulse for each beam position. In the multi optical fiber, the delay of the light pulse may be similarly controlled by changing a fiber length. However, when these optical elements are used, since the optical system becomes large and the light pulse width widens, so that it is preferable to use the configuration including the SLM in the waveform shaper 10 to control the time delay of the light pulse.

In the light pulse waveform shaper 10, as described above with reference to FIG. 4, the pixels of the SLM are divided in the spatial axis direction and the modulation pattern giving the phase change in the wavelength axis direction is presented on the modulation plane of the SLM, thereby delaying the light pulse for each divided pixel. The light pulse with the waveform shaped by the waveform shaper 10 is input to the wavelength conversion element 20 having the above-described configuration as the input light pulse of the wavelength conversion object.

Further, in such a configuration, it is preferable to form an image of a wavefront at the diffraction grating of the waveform shaper 10 on the crystal of the wavelength conversion element 20. In this case, it is preferable that an imaging optical system is provided between the light pulse waveform shaper 10 and the wavelength conversion element 20. In the configuration illustrated in FIG. 14, the imaging lens system 36 is inserted between the waveform shaper 10 and the wavelength conversion element 20. For example, in a case where the waveform shaper 10 having the above-described specific configuration is used, a focal length of the imaging lens system 36 is f=700 mm. Here, in FIG. 14, a magnification ratio in the imaging lens system 36 is 1, however, it may also be configured that the light pulse beam is enlarged or reduced by the imaging lens system 36 depending on the size of the crystal in the wavelength conversion element 20.

The wavelength conversion element 20 for example has the configuration illustrated in FIG. 6, inputs the input light pulse from the waveform shaper 10, and generates and outputs the output light pulse of the output frequency f(x) with the wavelength converted at each position x, as schematically illustrated by the output light pulse components $P_6$, $P_7$, and $P_8$ in FIG. 14.

Here, assuming that the frequency of the output THz wave pulse generated at an arbitrary crystal position x is f, and the delay amount of the light pulse is $\Delta t$, a phase shift $\Delta \phi$ of the THz wave is represented as $\Delta\phi=2\pi f\Delta t$. Therefore, it is possible to control the phase of the output THz wave pulse by delay control of the input light pulse. Further, by controlling the intensity of the input light pulse, the amplitude of the output THz wave pulse may also be controlled.

The output THz wave pulse generated by the wavelength conversion element 20 is input to the output optical system 30. In the configuration illustrated in FIG. 14, the off-axis parabolic mirror 31 is illustrated as an example of the specific output optical system 30. The output optical system 30 combines the THz wave pulse components having the output frequencies f(x) different from one another depending on the position x along the x-axis included in the output THz wave pulse from the wavelength conversion element 20, and generates the THz wave pulse as the final wavelength converted light pulse. Here, specifically, the output optical system 30 is not limited to the off-axis parabolic mirror, but various optical elements such as the diffraction grating for the THz wave, for example, may be used.

In the configuration illustrated in FIG. 14, in addition to the above-described pulse light source 35, light pulse waveform shaper 10, imaging lens system 36, wavelength conversion element 20, and output optical system 30, the photodetector 60, the lock-in amplifier 61, and the control device 62 are further provided. The THz wave pulse combined and output by the output optical system 30 is condensed on the photodetector 60. The photodetector 60 detects the THz wave pulse and outputs a detection signal. In a case where the output light pulse is the THz wave pulse, for example, a photoconductive antenna, an electrooptical crystal, or the like may be used as the photodetector 60.

The detection signal of the THz wave output from the photodetector 60 is input to the lock-in amplifier 61, and detection data is acquired by the control device 62 using a personal computer or the like. Further, the control device 62 controls the SLM included in the waveform shaper 10 as necessary. In this case, for the SLM, a feedback signal may be provided from the control device 62 so as to obtain a desired waveform of the THz wave.

As described above, according to the wavelength conversion light pulse waveform shaping device 1A obtained by combining the light pulse waveform shaper 10 for the initial light pulse and the wavelength conversion element 20 having the above-described configuration, the generation of the output light pulse such as the THz wave pulse by the wavelength conversion and the waveform shaping of the wavelength conversion light pulse may be preferably realized.

The wavelength conversion element and the wavelength conversion light pulse waveform shaping device according to the present invention are not limited to the above-described embodiments and configuration examples, and various modifications may be made. For example, although the THz wave pulse is mainly assumed as the output light pulse in the above embodiments, this is not limited to such THz wave pulse, and the above-described configuration may be applied to a wide frequency band from the THz wave to the visible light, for example, by appropriately selecting and setting the material of the crystal used for the wavelength conversion element, the periodical poled structure, and the like. Further, the configuration of the optical system of the wavelength conversion light pulse waveform shaping device is not limited to the configuration illustrated in FIG. 14, and various configurations may be specifically used.

The wavelength conversion element according to the above-described embodiment includes (1) a crystal having a periodically poled structure in which polarization is inverted with a predetermined inversion period $\Lambda$ along a second axis, with respect to a first axis and the second axis perpendicular to the first axis serving as an input axis of an input light pulse which is a wavelength conversion (frequency conversion) object, and (2) the wavelength conversion element is configured to generate an output light pulse converted to have an output frequency f(x) corresponding to the inversion period $\Lambda(x)$ at each position x by change of the inversion period $\Lambda$ according to the position x along the first axis, and (3) when a target frequency linearly changing with the position x is set to $$f_T(x)=b+ax \text{ (a and b are constants)},$$

a frequency width of the output frequency at the position x is set to $\delta f(x)$, and the output frequency is set to $$f(x)=f_T(x)+\alpha(x),$$

the output frequency f(x) is set to coincide with the target frequency $f_T(x)$ within a range satisfying a condition of $|\alpha(x)| \leq \delta f(x)$.

Here, in the above-described wavelength conversion element, regarding the setting of the target frequency, specifically, the target frequency $f_T(x)$ may be set by the following formula $$f_T(x)=f_1+((f_2-f_1)/d) \times x$$

by setting the constants a and b of the target frequency to $a=(f_2-f_1)/d$ and $b=f_1$, when the target frequency on a first end of the crystal serving as an origin of the position x along the first axis is set to $f_1$, the target frequency on a second end opposite to the first end is set to $f_2$, and a width from the first end to the second end along the first axis of the crystal is set to d.

Further, regarding the frequency width which determines a setting range of the output frequency with respect to the target frequency, the frequency width $\delta f(x)$ of the output frequency f(x) may be a width when an intensity in a frequency spectrum of the output light pulse is $1/e^2$ with respect to a peak intensity. Further, the frequency width $\delta f(x)$ may be a full width at half maximum of the intensity in the frequency spectrum of the output light pulse.

Further, the output frequency f(x) may also be set to substantially coincide with to the target frequency $f_T(x)$. Further, regarding the setting of the output frequency with respect to the target frequency, it is preferable to take an effect of manufacturing precision, a manufacturing error and the like of the periodically poled structure when actually manufacturing the crystal of the wavelength conversion element into consideration.

Further, regarding the inversion period $\Lambda$ corresponding to the output frequency f at each position x in the periodically poled structure, the polarization inversion period $\Lambda(x)$ in the crystal may be determined by the following formula $$\Lambda(x)=c/(f(x)\Delta n)$$

based on the output frequency f(x), by setting a speed of light to c, a refractive index of the crystal for the input light pulse to $n_{in}$, a refractive index of the crystal for the output light pulse to $n_{out}$, and a difference between the refractive indices to $\Delta n=n_{out}-n_{in}$, when an input direction of the input light pulse is the same as an output direction of the output light pulse. In this case, conversely, the output frequency f(x) is determined by the following formula $$f(x)=c/(\Lambda(x)\Delta n)$$

based on the inversion period $\Lambda(x)$.

Here, the input direction of the input light pulse and the output direction of the output light pulse may be opposite to each other. In this case, the polarization inversion period $\Lambda(x)$ in the crystal may be determined by the following formula $$\Lambda(x)=c/(f(x)\Delta n)$$

based on the output frequency f(x), by setting a speed of light to c, a refractive index of the crystal for the input light pulse to $n_{in}$, a refractive index of the crystal for the output light pulse to $n_{out}$, and a sum of the refractive indices to $\Delta n=n_{out}+n_{in}$, when an input direction of the input light pulse is opposite to an output direction of the output light pulse.

Further, regarding the output light pulse generated by the wavelength conversion of the input light pulse, specifically for example, the output light pulse may be a terahertz wave pulse having the output frequency of 0.1 THz or more and 10 THz or less. Further, the output light pulse may also be the light pulse other than the THz wave pulse, for example, an arbitrary light pulse with the wavelength longer than that of the input light pulse.

Further, a material of the crystal forming the wavelength conversion element may be, for example, lithium niobate $LiNbO_3$ or lithium tantalate $LiTaO_3$. Such crystal materials may be preferably used, for example, in generation of the THz wave pulse by the wavelength conversion.

Further, in the above-described wavelength conversion element, the crystal may include at least a first crystal region in which the target frequency is set to $$f_{T1}(x)=b_1+a_1x \text{ (}a_1 \text{ and } b_1 \text{ are constants)}$$

and a second crystal region in which the target frequency is set to $$f_{T2}(x)=b_2+a_2x \text{ ($a_2$ and $b_2$ are constants)}$$

along the first axis. Further, a plurality of crystal regions having different target frequencies in the wavelength conversion element may also include three or more crystal regions as necessary.

Further, the above-described wavelength conversion element may be formed by stacking a plurality of crystals having the periodically poled structure. Further, the above-described wavelength conversion element may be formed by shifting a center position in the second axis direction of the periodically poled structure at each position x along the first axis from a center position of the crystal according to the output frequency f(x) at the position x.

The wavelength conversion light pulse waveform shaping device according to the above-described embodiment includes (1) a light pulse waveform shaper configured to control at least a phase of an initial light pulse supplied from a pulse light source to generate the input light pulse having a predetermined waveform at each position x along the first axis, (2) the wavelength conversion element having the above-described configuration configured to input the input light pulse from the light pulse waveform shaper to generate the output light pulse after wavelength conversion to output, and (3) an output optical system configured to generate a final wavelength conversion light pulse to output by combining light pulse components having the output frequencies f(x) changing according to the position x along the first axis included in the output light pulse from the wavelength conversion element.

Further, in the wavelength conversion light pulse waveform shaping device having the above-described configuration, the light pulse waveform shaper used for waveform shaping of the input light pulse may include a spatial light modulator configured to control at least the phase of the initial light pulse. According to such a configuration, it is possible to preferably perform the waveform shaping of the input light pulse and the waveform shaping of the output light pulse after the wavelength conversion by using the spatial light modulator capable of controlling the light pulse waveform shaping pattern.

Further, in the wavelength conversion light pulse waveform shaping device having the above-described configuration, an imaging optical system may be provided between the light pulse waveform shaper and the wavelength conversion element. Further, regarding the configuration of the optical system in the waveform shaping device, various configurations may be set as necessary.

The present invention is applicable as the wavelength conversion element and the wavelength conversion light pulse waveform shaping device capable of being preferably applied to the waveform shaping of the light pulses such as the THz wave pulse.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A wavelength conversion element comprising:
a crystal having a periodically poled structure in which polarization is inverted with a predetermined inversion period Λ along a second axis, with respect to a first axis and the second axis perpendicular to the first axis serving as an input axis of an input light pulse of a wavelength conversion object, wherein
the wavelength conversion element is configured to generate an output light pulse converted to have an output frequency f(x) corresponding to the inversion period Λ(x) at each position x by change of the inversion period Λ according to the position x along the first axis, and
when a target frequency linearly changing with the position x is set to $f_T(x)=b+ax$ (where a and b are constants), a frequency width of the output frequency at the position x is set to δf(x), and the output frequency is set to $f(x)=f_T(x)+\alpha(x)$, the output frequency f(x) is set to coincide with the target frequency $f_T(x)$ within a range satisfying a condition $|\alpha(x)| \leq \delta f(x)$.

2. The wavelength conversion element according to claim 1, wherein the target frequency $f_T(x)$ is set by the following formula $$f_T(x)=f_1+((f_2-f_1)/d) \times x$$

by setting the constants a and b to $a=(f_2-f_1)/d$ and $b=f_1$, when the target frequency on a first end of the crystal serving as an origin of the position x along the first axis is set to $f_1$, the target frequency on a second end opposite to the first end is set to $f_2$, and a width from the first end to the second end along the first axis of the crystal is set to d.

3. The wavelength conversion element according to claim 1, wherein the frequency width δf(x) of the output frequency is a frequency range such that an intensity in a frequency spectrum of the output light pulse is reduced by a factor of $1/e^2$ with respect to a peak intensity at the edges of the frequency range.

4. The wavelength conversion element according to claim 1, wherein the output frequency f(x) is set to substantially coincide with the target frequency $f_T(x)$.

5. The wavelength conversion element according to claim 1, wherein the inversion period Λ(x) in the crystal is determined by the following formula $$\Lambda(x)=c/(f(x)\Delta n)$$

based on the output frequency f(x), by setting a speed of light to c, a refractive index of the crystal for the input light pulse to $n_{in}$, a refractive index of the crystal for the output light pulse to $n_{out}$, and a difference between the refractive indices to $\Delta n=n_{out}-n_{in}$, when an input direction of the input light pulse is the same as an output direction of the output light pulse.

6. The wavelength conversion element according to claim 1, wherein the inversion period Λ(x) in the crystal is determined by the following formula $$\Lambda(x)=c/(f(x)\Delta n)$$

based on the output frequency f(x), by setting a speed of light to c, a refractive index of the crystal for the input light pulse to $n_{in}$, a refractive index of the crystal for the output light pulse to $n_{out}$, and a sum of the refractive indices to $\Delta n=n_{out}+n_{in}$, when an input direction of the input light pulse is opposite to an output direction of the output light pulse.

7. The wavelength conversion element according to claim 1, wherein the output light pulse is a terahertz wave pulse having the output frequency of 0.1 THz or more and 10 THz or less.

8. The wavelength conversion element according to claim 1, wherein a material of the crystal is lithium niobate $LiNbO_3$ or lithium tantalate $LiTaO_3$.

9. The wavelength conversion element according to claim 1, wherein the crystal includes at least a first crystal region in which the target frequency is set to $f_{T1}(x)=b_1+a_1 x$ (where $a_1$ and $b_1$ are constants) and a second crystal region in which the target frequency is set to $f_{T2}(x)=b_2+a_2 x$ (where $a_2$ and $b_2$ are constants) along the first axis.

10. The wavelength conversion element according to claim 1, formed by stacking a plurality of crystals having the periodically poled structure.

11. The wavelength conversion element according to claim 1, formed by shifting a center position in the second axis direction of the periodically poled structure at each position x along the first axis from a center position of the crystal according to the output frequency f(x) at the position x.

12. A wavelength conversion light pulse waveform shaping device comprising:
   a light pulse waveform shaper configured to control at least a phase of an initial light pulse supplied from a pulse light source to generate the input light pulse having a predetermined waveform at each position x along the first axis;
   the wavelength conversion element according to claim 1 configured to input the input light pulse from the light pulse waveform shaper to generate the output light pulse after wavelength conversion; and
   an output optical system configured to generate a wavelength conversion light pulse to output by combining light pulse components having the output frequencies f(x) changing according to the position x along the first axis included in the output light pulse from the wavelength conversion element.

13. The wavelength conversion light pulse waveform shaping device according to claim 12, wherein the light pulse waveform shaper includes a spatial light modulator configured to control at least the phase of the initial light pulse.

14. The wavelength conversion light pulse waveform shaping device according to claim 12, wherein an imaging optical system is provided between the light pulse waveform shaper and the wavelength conversion element.

* * * * *